United States Patent
Ono

(10) Patent No.: US 9,435,245 B2
(45) Date of Patent: Sep. 6, 2016

(54) EXHAUST GAS PURIFICATION DEVICE FOR INTERNAL COMBUSTION ENGINE

(71) Applicant: Ryohei Ono, Susono (JP)

(72) Inventor: Ryohei Ono, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/416,145

(22) PCT Filed: Feb. 15, 2013

(86) PCT No.: PCT/JP2013/053712
§ 371 (c)(1),
(2) Date: Jan. 21, 2015

(87) PCT Pub. No.: WO2014/125620
PCT Pub. Date: Aug. 21, 2014

(65) Prior Publication Data
US 2015/0345357 A1 Dec. 3, 2015

(51) Int. Cl.
*B01D 53/94* (2006.01)
*F01N 3/36* (2006.01)
(Continued)

(52) U.S. Cl.
CPC ............ *F01N 3/36* (2013.01); *B01D 53/9431* (2013.01); *B01D 53/9495* (2013.01); *F01N 3/0842* (2013.01); *F01N 3/0871* (2013.01); *F01N 3/0885* (2013.01); *F01N 9/00* (2013.01); *F01N 9/002* (2013.01); *F01N 2470/18* (2013.01); *F01N 2560/08* (2013.01); *F01N 2560/14* (2013.01);
(Continued)

(58) Field of Classification Search
None
See application file for complete search history.

(56) References Cited

U.S. PATENT DOCUMENTS

| 2009/0107122 A1* | 4/2009 | Ikeda | F01N 13/0097 60/286 |
|---|---|---|---|
| 2012/0124971 A1 | 5/2012 | Bisaiji et al. | |
| 2012/0131908 A1 | 5/2012 | Bisaiji et al. | |

FOREIGN PATENT DOCUMENTS

| EP | 2 402 572 A1 | 1/2012 | |
| EP | 2402572 A1 * | 1/2012 | ......... B01D 53/9422 |
| EP | 2 460 990 A1 | 6/2012 | |

(Continued)

OTHER PUBLICATIONS

Yasuo et al. JP2002038941A—translated, 2002.*

(Continued)

*Primary Examiner* — Walter D Griffin
*Assistant Examiner* — Jelitza Perez
(74) *Attorney, Agent, or Firm* — Finnegan, Henderson, Farabow, Garrett & Dunner, LLP

(57) ABSTRACT

An internal combustion engine is configured in such a manner that an exhaust gas purification catalyst (13) and a hydrocarbon supply valve (15) are provided in an exhaust gas passage. An exhaust gas purification device selectively uses: a first NOx purification method in which hydrocarbon is sprayed from the hydrocarbon supply valve at predetermined intervals, purifying NOx contained in exhaust gas; and a second NOx purification method in which the air-fuel ratio of exhaust gas which flows into the exhaust gas purification catalyst is made rich at intervals longer than the predetermined intervals, causing the exhaust gas purification catalyst to release occluded NOx and cleaning the NOx. It is determined whether or not the exhaust gas purification catalyst is clogged with the deposition of particulates in the exhaust gas. When it is determined that the exhaust gas purification catalyst is clogged, the second NOx purification method is used.

5 Claims, 26 Drawing Sheets

(51) Int. Cl.
 *F01N 3/08* (2006.01)
 *F01N 9/00* (2006.01)
(52) U.S. Cl.
 CPC .... *F01N 2610/03* (2013.01); *F01N 2610/1453* (2013.01); *Y02T 10/47* (2013.01)

(56) References Cited

FOREIGN PATENT DOCUMENTS

| | | | | |
|---|---|---|---|---|
| EP | 2460987 | A1 * | 6/2012 | ......... B01D 53/9422 |
| EP | 2 472 078 | A1 | 7/2012 | |
| JP | 2002038941 | A * | 2/2002 | |
| JP | 2005-248760 | A | | 9/2005 |
| JP | 4868096 | | | 11/2011 |
| JP | 4893876 | | | 1/2012 |
| WO | WO 2005/088095 | A1 | | 9/2005 |
| WO | WO 2011/114501 | A1 | | 9/2011 |

OTHER PUBLICATIONS

U.S. Appl. No. 14/763,215, filed Jul. 24, 2015.

\* cited by examiner

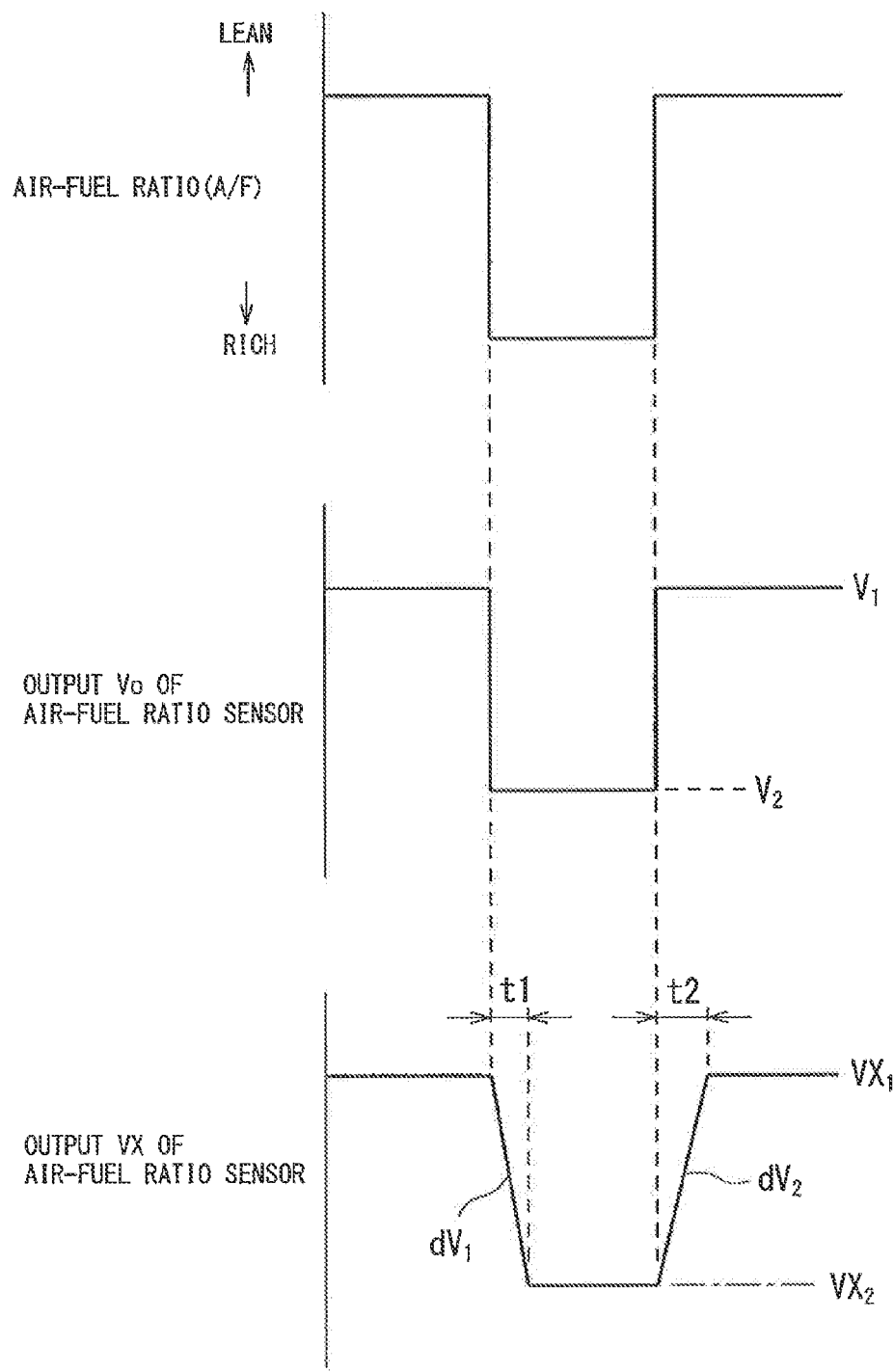

EXHAUST GAS PURIFICATION DEVICE FOR INTERNAL COMBUSTION ENGINE

TECHNICAL FIELD

The present invention relates to an exhaust purification device for an internal combustion engine.

BACKGROUND ART

Know in the art is an exhaust purification device for an internal combustion engine in which an exhaust purification catalyst is arranged inside an engine exhaust passage and a hydrocarbon feed valve is arranged upstream of the exhaust purification catalyst in the engine exhaust passage, a precious metal catalyst is carried on an exhaust gas flow surface of the exhaust purification catalyst and a basic exhaust gas flow surface part is formed around the precious metal catalyst, the exhaust purification catalyst has the property of reducing the $NO_x$ which is contained in the exhaust gas when making the concentration of hydrocarbons which flow into the exhaust purification catalyst vibrate by within a predetermined range of amplitude and within a predetermined range of period and has the property of being increased in amount of storage of $NO_x$ which is contained in the exhaust gas if making the vibration period of the hydrocarbon concentration longer than the predetermined range, and a first $NO_x$ removal method in which $NO_x$ contained in the exhaust gas is removed by injecting hydrocarbons from the hydrocarbon feed valve by the predetermined period and, a second $NO_x$ removal method in which stored $NO_x$ is released from the exhaust purification catalyst to remove the $NO_x$ by making the air-fuel ratio of the exhaust gas which flows in to the exhaust purification catalyst rich by a period longer than the predetermined period, are selectively used (for example, see PLT 1). In this exhaust purification device, for example, the $NO_x$ removal action by the first $NO_x$ removal method is performed when the temperature of the exhaust purification catalyst is high, while the $NO_x$ removal action by the second $NO_x$ removal method is performed when the temperature of the exhaust purification catalyst is low.

CITATIONS LIST

Patent Literature

PLT 1: WO2011/114501

SUMMARY OF INVENTION

Technical Problem

In this regard, exhaust gas which is exhausted from an engine contains various particulates, but usually these particulates slip through the exhaust purification catalyst and therefore usually these particulates do not deposit on the upstream side end face of the exhaust purification catalyst or inside the exhaust purification catalyst. In this regard, however, if the $NO_x$ removal action by the first $NO_x$ removal method is performed, not only the particulates which are exhausted from the engine, but also the hydrocarbons which are injected from the hydrocarbon feed valve will flow into the exhaust purification catalyst with a high frequency, so the upstream side end face of the exhaust purification catalyst is liable to gradually increase in buildup of particulates and hydrocarbons. That is, if referring to the particulates which are exhausted from the engine and the hydrocarbons which are injected from the hydrocarbon feed valve as the "particulates in the exhaust gas", when the $NO_x$ removal action by the first $NO_x$ removal method is performed, particulates in the exhaust gas will deposit on the upstream side end face of the exhaust purification catalyst. Further, while explained in detail later, if particulates in the exhaust gas continue to flow to the upstream side end face of the exhaust purification catalyst, the catalyst will clog due to buildup of the particulates in the exhaust gas.

If the upstream side end face of the exhaust purification catalyst clogs due to buildup of particulates, the amount of hydrocarbons which flow into the exhaust purification catalyst will decrease. In this case, the amount of hydrocarbons which is used for producing the reducing intermediate will decrease. Therefore, if the amount of hydrocarbons which flows into the exhaust purification catalyst decreases, the amount of production of the reducing intermediate will decrease and as a result the $NO_x$ removal rate will drop. Therefore, if the $NO_x$ removal action by the first $NO_x$ removal method is performed when the upstream side end face of the exhaust purification catalyst is clogged by buildup of particulates, the $NO_x$ is liable to become unable to be reliably removed.

An object of the present invention is to provide an exhaust purification device for an internal combustion engine which can remove $NO_x$ reliably even when the exhaust purification catalyst becomes clogged.

Solution to Problem

According to the present invention, there is provided an exhaust purification device for an internal combustion engine in which an exhaust purification catalyst is arranged inside an engine exhaust passage and a hydrocarbon feed valve is arranged upstream of the exhaust purification catalyst in the engine exhaust passage, a precious metal catalyst is carried on an exhaust gas flow surface of the exhaust purification catalyst and a basic exhaust gas flow surface part is formed around the precious metal catalyst, the exhaust purification catalyst has the property of reducing the $NO_x$ which is contained in the exhaust gas when making the concentration of hydrocarbons which flow into the exhaust purification catalyst vibrate by within a predetermined range of amplitude and within a predetermined range of period and has the property of being increased in amount of storage of $NO_x$ which is contained in the exhaust gas if making the vibration period of the hydrocarbon concentration longer than the predetermined range, a first $NO_x$ removal method in which $NO_x$ contained in the exhaust gas is removed by injecting hydrocarbons from the hydrocarbon feed valve by the predetermined period and, a second $N_x$ removal method in which stored $NO_x$ is released from the exhaust purification catalyst to remove the $NO_x$ by making the air-fuel ratio of the exhaust gas which flows into the exhaust purification catalyst rich by a period longer than the predetermined period, are selectively used, it is judged whether the exhaust purification catalyst is clogged due to buildup of particulates in the exhaust gas, and the $NO_x$ removal action by the second $NO_x$ removal method is performed when it is judged that the exhaust purification catalyst is clogged due to buildup of particulates in the exhaust gas.

Advantageous Effects of Invention

It is possible to reliably remove $NO_x$ even when the exhaust purification catalyst becomes clogged.

BRIEF DESCRIPTION OF DRAWINGS

FIG. 27 is a view which shows changes in the output value of an air-fuel ratio sensor.

DESCRIPTION OF EMBODIMENTS

Figure 1:
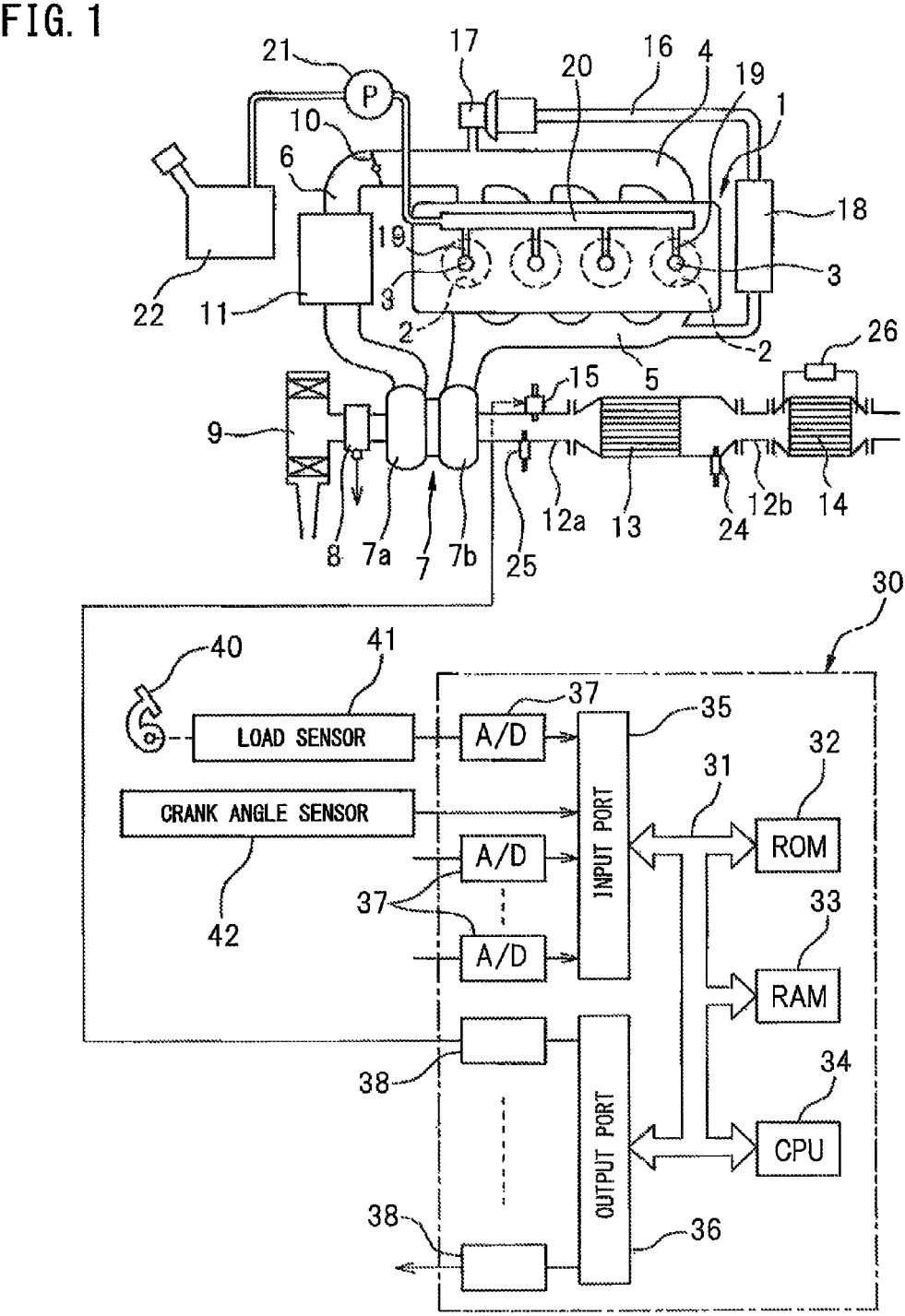
FIG. 1 is an overall view of a compression ignition type internal combustion engine.

FIG. 1 is an overall view of a compression ignition type internal combustion engine. Referring to FIG. 1, indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by an actuator is arranged. Around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. An outlet of the exhaust turbine 7b is connected through an exhaust pipe 12a to an inlet of the exhaust purification catalyst 13. In this embodiment according to the present invention, this exhaust purification catalyst 13 is comprised of an $NO_x$ storage catalyst. An outlet of the exhaust purification catalyst 13 is connected through the exhaust pipe 12b to the particulate filter 14. Upstream of the exhaust purification catalyst 13 inside the exhaust pipe 12a, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 1, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling EGR gas which flows through the inside of the EGR passage 16. In the embodiment shown in FIG. 1, the engine cooling water is guided to the inside of the cooling device 18 where the engine cooling water is used to cool the EGR gas. Each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 20 is fed through each fuel feed tube 19 to the fuel injector 3.

An electronic control unit 30 is comprised of a digital computer provided with a components which are connected with each other by a bidirectional bus 31 such as a ROM (read only memory) 32, a RAM (random access memory) 33, a CPU (microprocessor) 34, an input port 35, and an output port 36. Downstream of the exhaust purification catalyst 13, a temperature sensor 24 for detecting the temperature of the exhaust gas which flows out from the exhaust purification catalyst 13 is attached. The temperature of the exhaust gas which flows out from the exhaust purification catalyst 13 represents the temperature of the exhaust purification catalyst 13. Further, upstream of the exhaust purification catalyst 13 in the exhaust pipe 12a, a pressure sensor 25 is attached for detecting the pressure inside of the exhaust pipe 12a. Further, at the particulate filter 14, a differential pressure sensor 26 for detecting a differential pressure across the particulate filter 14 is attached. The output signals of these temperature sensor 24, pressure sensor 25, and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, actuator for driving the throttle valve 10, hydrocarbon feed valve 15, EGR control valve 17, and fuel pump 21.

Figure 2:
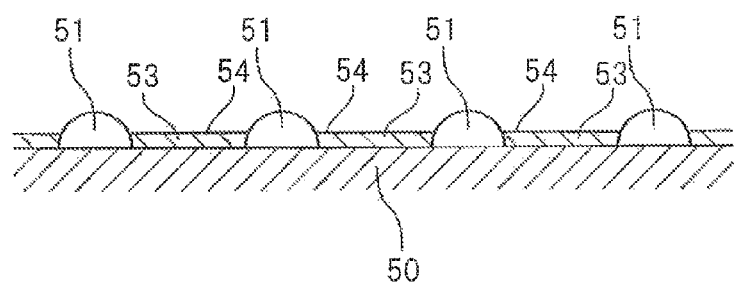
FIG. 2 is a view which schematically shows a surface part of a catalyst carrier.

FIG. 2 schematically shows a surface part of a catalyse carrier which is carried or a substrate of the exhaust purification catalyst 13 which is shown in FIG. 1. At this exhaust purification catalyst 13, as shown in FIG. 2, for example, a catalyst carrier 50 which is comprised of alumina carries a precious metal catalyst 51 which is comprised of platinum Pt. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal, able to deviate electrons to $NO_x$. Inside of this basic layer 53, ceria $CeO_2$ is contained. Therefore, the exhaust purification catalyst 13 has an oxygen storing ability. Further, the catalyst carrier 50 of the exhaust purification catalyst 13 can also carry rhodium Rh or palladium Pd in addition to platinum Pt. Note that the exhaust gas flows along the top of the catalyst carrier 50, so the precious metal catalyst 51 can be said to be carried on the exhaust gas flow surface of the exhaust purification catalyst 13. Further, the surface of the basic layer 53 exhibits basicity, so the surface of the basic layer 53 is called the "basic exhaust gas flow surface part 54."

Figure 3:
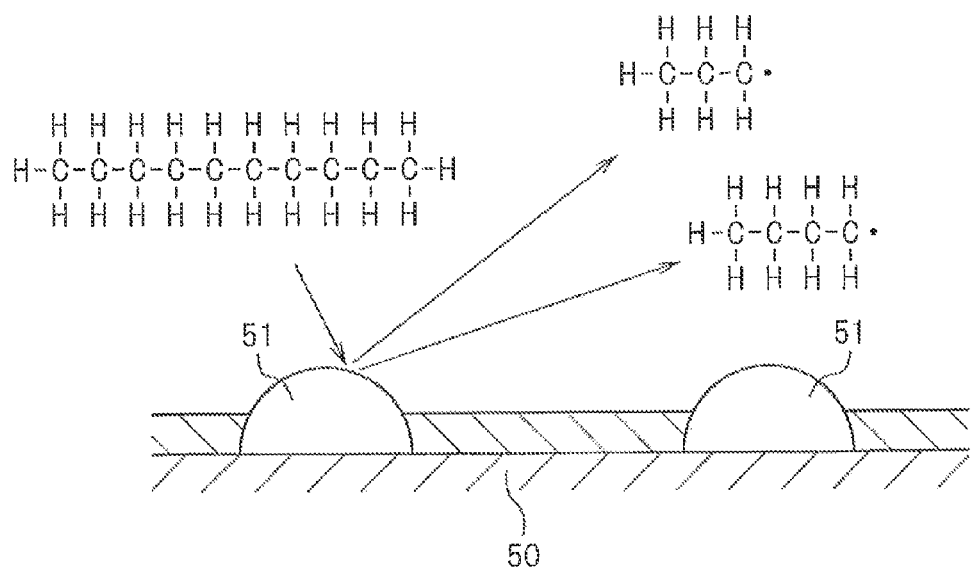
FIG. 3 is a view for explaining an oxidation reaction in an exhaust purification catalyst.

If hydrocarbons are injected from the hydrocarbon feed, valve 15 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reforming action performed at the exhaust purification catalyst 13 at this time. As shown in FIG. 3, the hydrocarbons HC which are injected from the hydrocarbon feed valve 15 become radical hydrocarbons HC with a small carbon number by the precious metal catalyst 51.

Figure 4:
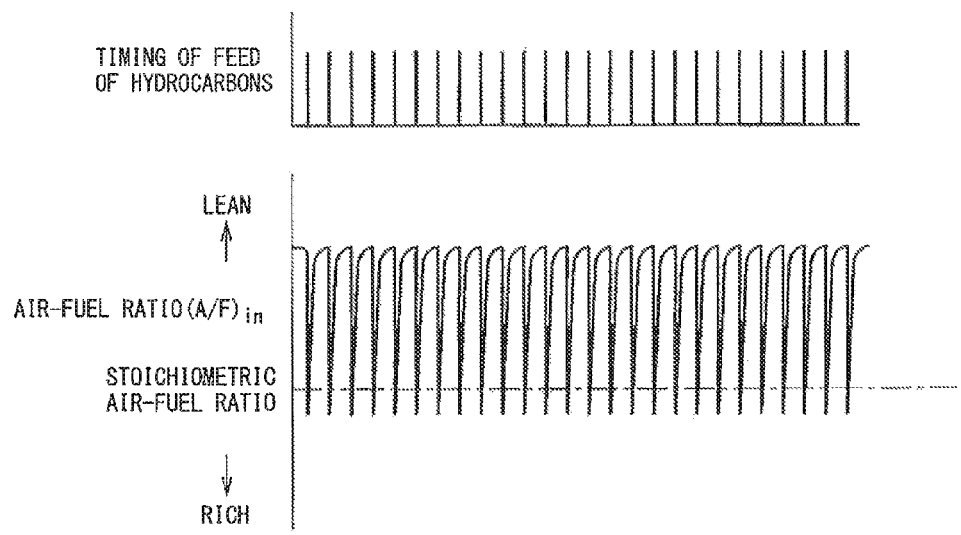
FIG. 4 is a view which shows a change of an air-fuel ratio of exhaust gas which flows into an exhaust purification catalyst.

FIG. 4 shows the feed timing of hydrocarbons from the hydrocarbon feed valve 15 and the change in the air-fuel ratio (A/F) in of the exhaust gas which flows into the exhaust purification catalyst 13. Note that, the changes in the air-fuel ratio (A/F) in depend on the change in concentration of the hydrocarbons in the exhaust gas which flows into the exhaust purification catalyst 13, so it can be said that the change in the air-fuel ratio (A/F) in shown in FIG. 4 represents the change in concentration of the hydrocarbons. However, if the hydrocarbon concentration becomes higher, the air-fuel ratio (A/F) in becomes smaller, so, in FIG. 4, the more to the rich side oho air-fuel ratio (A/F) in becomes, the higher the hydrocarbon concentration.

Figure 5:
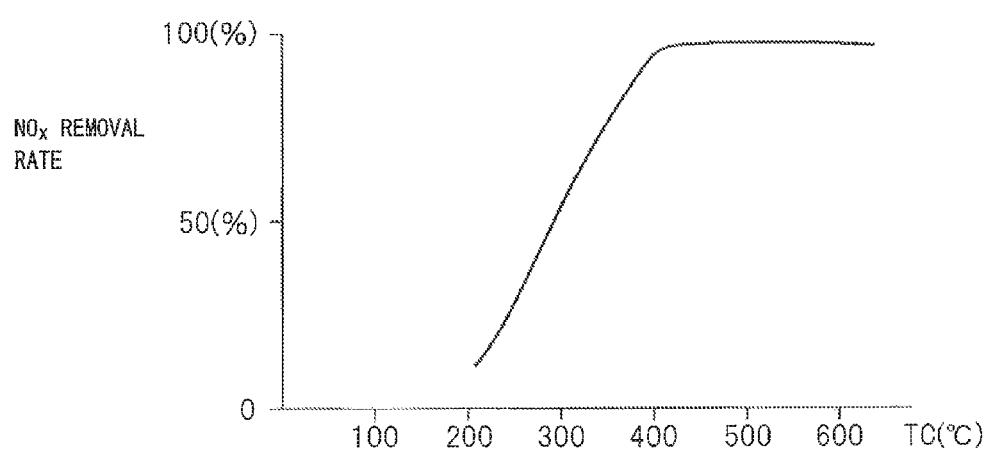
FIG. 5 is a view which shows an $NO_x$ removal rate.

FIG. 5 shows the $NO_x$ removal rate by the exhaust purification catalyst 13 with respect to the catalyst temperatures of the exhaust purification catalyst 13 when periodically making the concentration of hydrocarbons which flow into the exhaust purification catalyst 13 change so as to, as shown in FIG. 4, make the air-fuel ratio (A/F) in of the exhaust gas which flows to the exhaust purification catalyst 13 change. The inventors engaged in research relating to $NO_x$ purification for a long time. As a result, they learned that if making the concentration of hydrocarbons which flow into the exhaust purification catalyst 13 vibrate by within a predetermined range of amplitude and within a predetermined range of period, as shown in FIG. 3, an extremely nigh $NO_x$ removal rate is obtained even in a 400° C. or higher nigh temperature region.

Figure 6A:
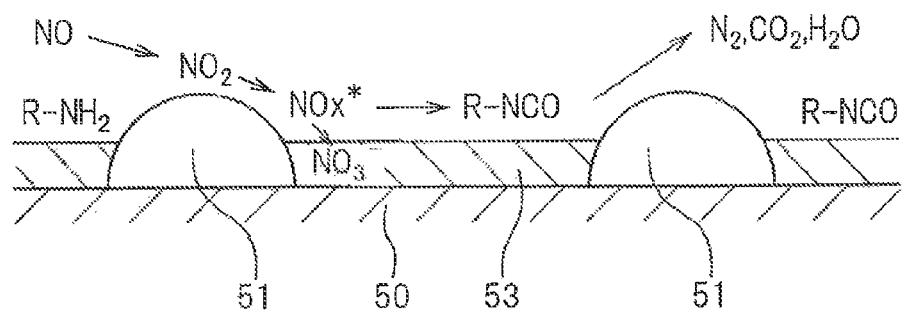
FIGS. 6A and 6B are views for explaining an oxidation reduction reaction in an exhaust purification catalyst.
Figure 6B:
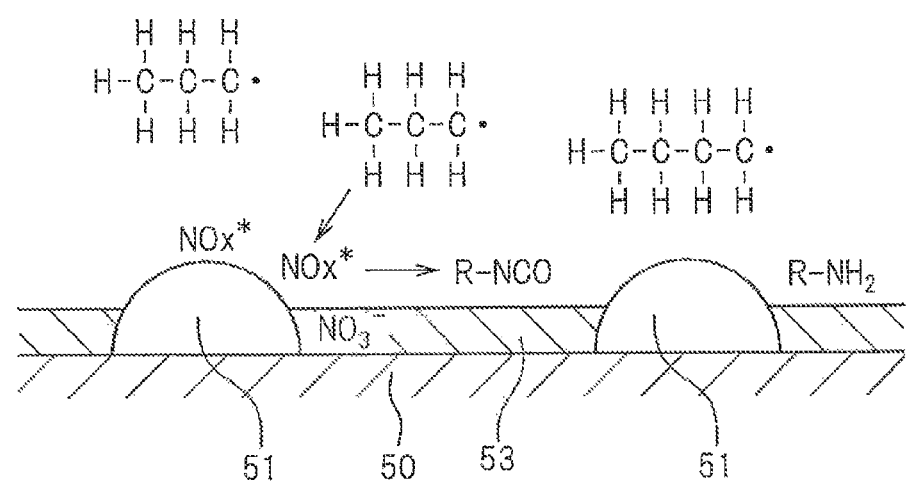

Furthermore, if is learned that, at this time, a large amount of reducing intermediate containing nitrogen and hydrocarbons continues to be held or adsorbed, on the surface of the basic layer 53, that is, on the basic exhaust gas flow surface part 54 of the exhaust purification catalyst 13, and that this reducing, intermediate plays a central role in obtaining a high $NO_x$ removal rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons which flow into the exhaust purification catalyst 13 is made to vibrate by within a predetermined range of amplitude and within a predetermined range of period.

FIG. 6A shows the case where the concentration of hydrocarbons which flow into the exhaust purification catalyst 13 is low, while FIG. 6B shows the case where hydrocarbons are fed from the hydrocarbon feed, valve 15 and the air-fuel ratio (A/F) in of the exhaust gas which flows into the exhaust purification catalyst 13 is made rich, that is, when the concentration of hydrocarbons which flow into the exhaust purification catalyst 13 becomes high.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. At this time, part of the NO which is contained in the exhaust gas deposits on the exhaust purification catalyst 13 and part of the NO which is contained in the exhaust gas, as shown in FIG. 6A, is oxidized on the platinum 51 and becomes $NO_2$. Next, this $NO_2$ is further oxidized and becomes $NO_3$. Further part of the $NO_2$ becomes $NO_2^-$. Therefore, on the platinum Pt 51, $NO_2^-$ and $NO_3$ are produced. The NO which are deposited on the exhaust purification catalyst. 13 and the $NO_2^-$ and $NO_3$ which are produced on platinum Pt 51 are strong in activity. Therefore, below, these NO, $NO_2^-$ and $NO_3$ will be referred to as the active $NO_x^*$.

On the other hand, if hydrocarbons are fed from the hydrocarbon feed valve 15 and the air-fuel ratio (A/F in of the exhaust gas which flows into the exhaust purification catalyst. 13 is made rich, the hydrocarbons successively deposit across the exhaust purification catalyst 13 as a whole. The majority of the deposited hydrocarbons is successively reacted with the oxygen and made to burn, while part of the deposited hydrocarbons is successively, as shown in FIG. 3, reformed and becomes radicalized inside of the exhaust purification catalyst 13. Therefore, as shown in FIG. 6B, the hydrocarbon concentration around the active $NO_x^*$ becomes higher. In this regard, if, after the active $NO_x^*$ is produced, the state of a high oxygen concentration around the active $NO_x^*$ continues for a constant time or more, the active $NO_x^*$ is oxidized and is absorbed in the form of nitrate ions $NO_3^-$ inside the basic layer 53. However, if, before this constant time elapses, the hydrocarbon concentration around the active $NO_x^+$ becomes higher, as shown in FIG. 6B, the active $NO_x^+$ reacts on the platinum 51 with the radical hydrocarbons HC to thereby form the reducing intermediate. This reducing intermediate is adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO, when hydrolyzed, becomes an amine compound R—$NH_2$. However, in this case, what is hydrolyzed is considered to be part of the isocyanate compound R—NCO. Therefore, as shown in FIG. 6B, the majority of the reducing intermediate which is held or adsorbed on the surface of the basic layer 53 is believed to be the isocyanate compound R—NCO and amine compound R—$NH_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, if the concentration of hydrocarbons which flow into the exhaust purification catalyst 13 is lowered and then the hydrocarbons which deposit around the reducing intermediate are oxidized and consumed and, due to this, the oxygen concentration around the reducing intermediate becomes higher, the reducing intermediate reacts with the $NO_x$ in the exhaust gas or the active $NO_x^+$ or reacts with the surrounding oxygen or breaks down on its own. Due to this, the reducing intermediate R—NCO or R—$NH_2$, as shown in FIG. 6A, is converted to $N_2$, $CO_2$, and $H_2O$ and therefore $NO_x$ is removed.

In this way, in the exhaust purification catalyst 13, by making the concentration of hydrocarbons which flow into the exhaust purification catalyst 13 higher, a reducing intermediate is produced. The concentration of hydrocarbons which flow into the exhaust purification catalyst 13 is lowered and the oxygen concentration is raised so that the reducing intermediate reacts with the $NO_x$ in the exhaust gas or the active $NO_x^+$ or oxygen or breaks down by itself whereby the $NO_x^+$ is removed. That is, in order for the exhaust purification catalyst 13 to remove the $NO_x$ the concentration of hydrocarbons which flow into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the $NO_x$ in the exhaust gas or the active $NO_x^+$ and oxygen or for making it break down on its own. That is, it is necessary to make the concentration of hydrocarbons which flow into the exhaust purification catalyst 13 vibrate by within a predetermined range of amplitude. Note that, in this case, it is necessary to hold these reducing intermediates on the basic layer 53, that is, the basic exhaust gas flow surface part 54, until the produced reducing intermediate R—NCO or R—$NH_2$ reacts with the $NO_x$ in the exhaust gas or the active $NO_x^+$ or oxygen or breaks down on its own. For this reason, the basic exhaust gas flow surface part 54 is provided.

On the other hand, if lengthening the feed period of the hydrocarbons, the time period in which the oxygen concentration becomes higher becomes longer in the period after the hydrocarbons are fed until the hydrocarbons are next fed. Therefore, the active $NO_x^+$ is absorbed in the basic layer 53 in the form of nitrates without producing a reducing intermediate. To avoid this, it is necessary to make the concentration of hydrocarbons which flow into the exhaust purification catalyst 13 vibrate by within a predetermined range of period.

Therefore, in an embodiment of the present invention, to make the $NO_x$ which is contained in the exhaust gas and the reformed hydrocarbons react and produce the reducing intermediate R—NCO or R—$NH_2$ containing nitrogen and hydrocarbons, a precious metal catalyst 51 is carried on the exhaust gas flow surface of the exhaust purification catalyst 13. To hold the produced reducing intermediate R—NCO or R—$NH_2$ inside the exhaust purification catalyst 13, a basic exhaust gas flow surface part 54 is formed around the precious metal catalyst 51. The reducing intermediate P—NCO or P—$NH_2$ which is held on the basic exhaust gas flow surface part 54 is converted to $N_2$, $CO_2$, and $H_2O$, and the vibration period of the hydrocarbon concentration is made the vibration period required for continuation of the production of the reducing intermediate R—NCO or R—$NH_2$. Incidentally, in the example shown in FIG. 4, the injection interval is made 3 seconds.

Figure 7A:
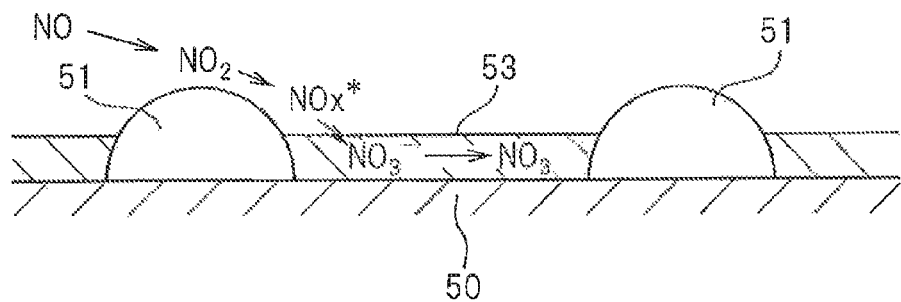
FIGS. 7A and 7B are views for explaining an oxidation reduction reaction in an exhaust purification catalyst.

If the vibration period of the hydrocarbon concentration, that is, the injection period of the hydrocarbons HC from the hydrocarbon feed valve 15, is made longer than the above predetermined range of period, the reducing intermediate R—NCO or R—$NH_2$ disappears from the surface of the basic layer 53. At this time, the active $NO_x^+$ which is produced on the platinum Pt 53, as shown in FIG. 7A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 7B:
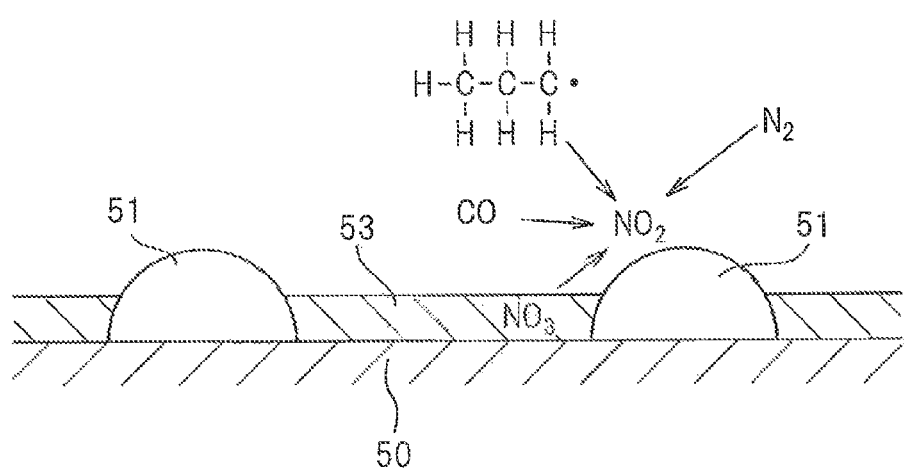

On the other hand, FIG. 7B shows the case where the air-fuel ratio of the exhaust gas which flows into the exhaust purification catalyst 13 is made the stoichiometric air-fuel ratio or rich when the $NO_x$ is absorbed in the form of nitrates inside of the basic layer 53 in this way. In this case, the oxygen concentration in the exhaust gas falls, so the reaction proceeds in the opposite direction ($NO_3^- \rightarrow NO_2$), and consequently the nitrates absorbed in the basic layer 53 become nitrate ions $NO_3^-$ one by one and, as shown in FIG. 7B, are released from the basic layer 53 in the form of $NO_2$. Next, the released $NO_2$ is reduced by the hydrocarbons HC and CO contained in the exhaust gas.

Figure 8:
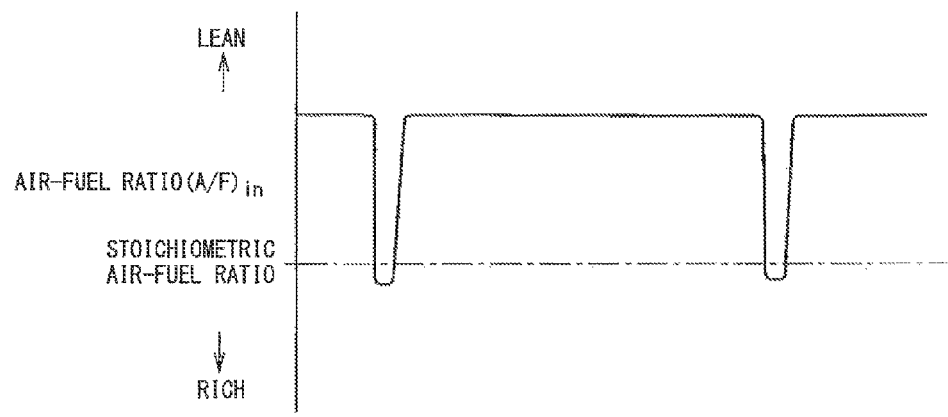
FIG. 8 is a view which shows a change of an air-fuel ratio of exhaust gas which flows into an exhaust purification catalyst.

FIG. 8 shows the case of making the air-fuel ratio (A/F) in of the exhaust gas which flows into the exhaust purification catalyst 13 temporarily rich slightly before the $NO_x$ absorption ability of the basic layer 53 becomes saturated. Note that, in the example shown in FIG. 8, the time interval of this rich control is 1 minute or more. In this case, the $NO_x$ which was absorbed in the basic layer 53 when the air-fuel ratio (A/F) in of the exhaust gas was lean is released all at once from the basic layer 53 and reduced when the air-fuel ratio (A/F) in of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$. Therefore, if using the term of "storage" as a term including both absorption and adsorption, at this time, the basic layer 53 performs the role of an $NO_x$ storage agent for temporarily storing the $NO_x$. That is, in this case, if the ratio of the air and fuel (hydrocarbons) which are supplied into the engine intake passage, combustion chambers 2, and exhaust passage upstream of the exhaust purification catalyst 13 is referred to as "the air-fuel ratio of the exhaust gas", the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

Figure 9:
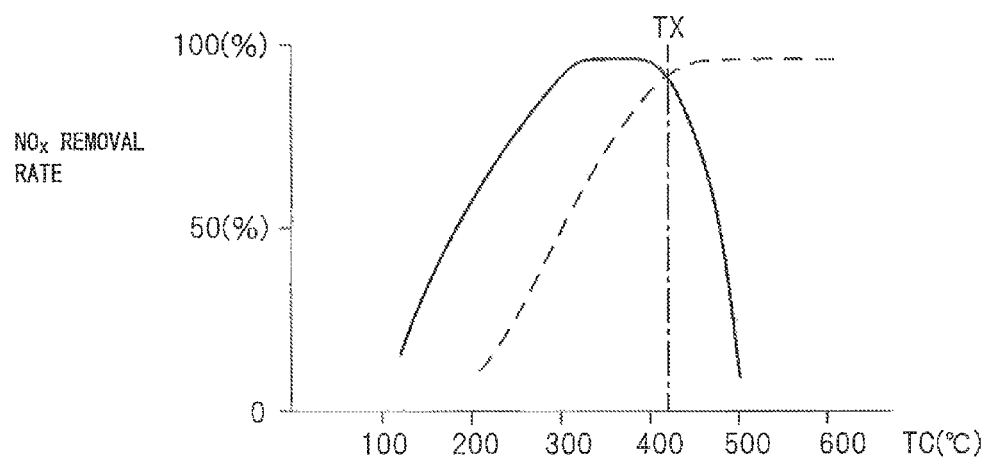
FIG. 9 is a view of an $NO_x$ removal rate.

In FIG. 9, the solid line shows the $NO_x$ removal rate when making the exhaust purification catalyst 13 function as an $NO_x$ storage catalyst in this way. Note that, in FIG. 9, the abscissa shows the catalyst temperature TC of the exhaust purification catalyst 13. When making the exhaust purification catalyst 13 function as an $NO_x$ storage catalyst in this way, as shown in FIG. 9 by the solid line, when the catalyst temperature TC is 300° C. to 400° C., an extremely high $NO_x$ removal rate is obtained, but when the catalyst temperature TC becomes a 400° C. or higher high temperature, the $NO_x$ removal rate falls. Note that FIG. 9 shows the $NO_x$ removal rate which is shown in FIG. 5 by a broken line.

In this way, when the catalyst temperature TC becomes 400° C. or more, the $NO_x$ removal rate falls because if the catalyst temperature TC becomes 400° C. or more, the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ removal rate. However, in the new $NO_x$ removal method shown from FIG. 4 to FIGS. 6A and 6B, as will be understood from FIGS. 6A and 6B, nitrates are not formed or even if formed are extremely fine in amount, consequently, as shown in FIG. 5, even when the catalyst temperature TC is high, a high $NO_x$ removal rate is obtained.

In this embodiment of the present invention, to use this new $NO_x$ removal method to remove $NO_x$, a hydrocarbon feed valve 15 for feeding hydrocarbons is arranged inside of an engine exhaust passage, an exhaust purification catalyst 13 is arranged downstream of the hydrocarbon feed valve 15 in the engine exhaust passage, a precious metal catalyst 51 is carried on the exhaust gas flow surface of the exhaust purification catalyst 13, a basic exhaust gas flow surface part 54 is formed around the precious metal catalyst 51, the exhaust purification catalyst 13 has the property of reducing the $NO_x$ which is contained in exhaust gas if the concentration of hydrocarbons which flow into the exhaust purification catalyst 13 is made to vibrate within a predetermined range of amplitude and within a predetermined range of period and has the property of being increased in storage amount of $NO_x$ which is contained in exhaust gas if the vibration period of the hydrocarbon concentration is made longer than this predetermined range, and, at the time of engine operation, hydrocarbons are injected by a predetermined period to thereby reduce the $NO_x$ which is contained in the exhaust gas in the exhaust purification catalyst 13.

That is, the $NO_x$ removal method which is shown from FIG. 4 to FIGS. 6A and 6B can be said to be a new $NO_x$ removal method designed to remove $NO_x$, without forming almost any nitrates in the case of using an exhaust purification catalyst which carries a precious metal catalyst and forms a basic layer which can absorb $NO_x$. In actuality, when using this new $NO_x$ removal method, the nitrates which are detected from the basic layer 53 become much smaller in amount compared with the case where making the exhaust purification catalyst 13 function as an $NO_x$ storage catalyst. Note that, this new $NO_x$ removal method will be referred to below as "the first $NO_x$ removal method".

Figure 10:
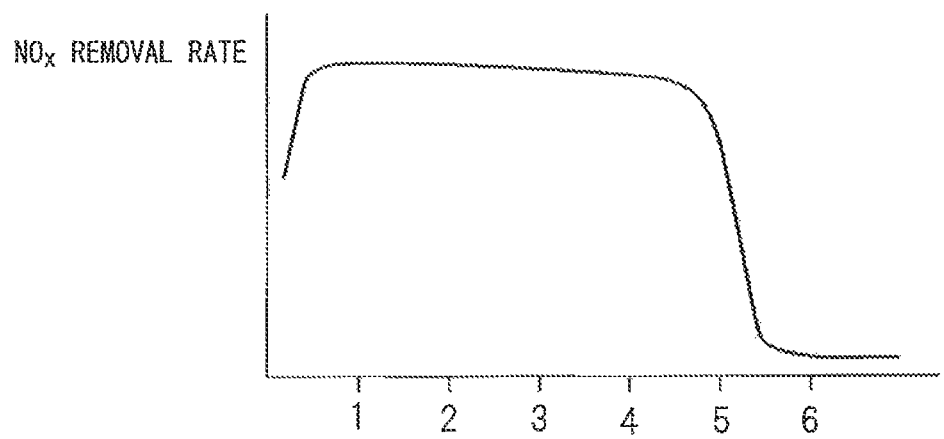
FIG. 10 is a view which shows a relationship between an injection period ΔT of hydrocarbons and an $NO_x$ removal rate.

Now, as explained above, if the injection period ΔT of the hydrocarbons from the hydrocarbon feed valve 15 becomes longer, the time period during which the oxygen concentration around the active $NO_x^*$ becomes higher becomes longer in the period after the hydrocarbons are injected to when the hydrocarbons are next injected. In this case, in the embodiment which is shown in FIG. 1, if the injection period ΔT of the hydrocarbons becomes longer than about 5 seconds, the active $NO_x^*$ starts to be absorbed in the form of nitrates inside the basic layer 53. Therefore, as shown in FIG. 10, if the vibration period ΔT of the hydrocarbon concentration becomes longer than about 5 seconds, the $NO_x$ removal rate falls. Therefore, in the embodiment which is shown in FIG. 1, the injection period ΔT of the hydrocarbons has to be made 5 seconds or less.

On the other hand, in this embodiment according to the present invention, if the injection period ΔT of the hydrocarbons becomes about 0.3 second or less, the fed hydrocarbons start to build up on the exhaust gas flow surface of the exhaust purification catalyst 13, therefore, as shown in FIG. 10, if the injection period ΔT of the hydrocarbons becomes about 0.3 second or less, the $NO_x$ removal rate falls. Therefore, in this embodiment of the present invention, the injection period of the hydrocarbons is made from 0.3 second to 5 seconds.

Figure 11:
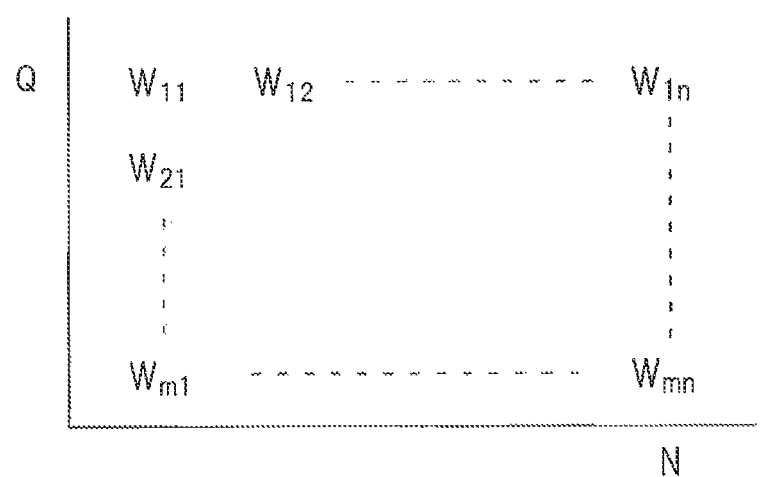
FIG. 11 is a map which shows an injection amount of hydrocarbons.

Now, in this embodiment according to the present invention, control is performed to change the amount of hydrocarbon injection from the hydrocarbon feed valve 15 and the injection timing so that the air-fuel ratio (A/F) in of the exhaust gas which flows into the exhaust purification catalyst 13 and the injection period ΔT become the optimum values in accordance with the operating state of the engine. In this case, in this embodiment according to the present invention, the optimum hydrocarbon injection amount W when the $NO_x$ removal action by the first $NO_x$ removal method is being performed is stored as a function of the amount of depression L of the accelerator pedal 40 and the engine speed N in the form of a map such as shown in FIG. 11 in advance in the ROM 32. Further, the optimum injection period ΔT of the hydrocarbons at this time is also stored as a function of the amount of depression L of the accelerator pedal 40 and the engine speed N in the form of a map in advance in the ROM 32.

Figure 12:
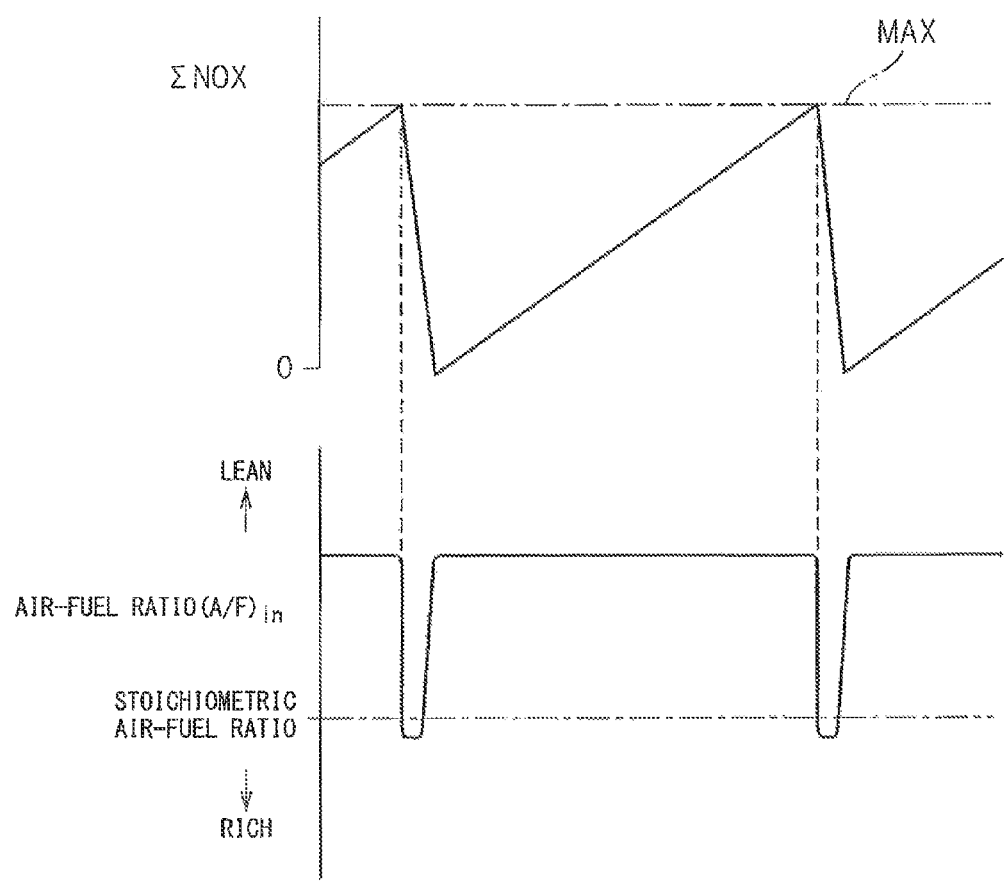
FIG. 12 is a view which shows $NO_x$ release control.

Next, while referring to FIG. 12 to FIG. 15, the $NO_x$ removal method in the case of making the exhaust purification catalyst 13 function as an $NO_x$ storage catalyst will be specifically explained. The $NO_x$ removal method in the case of making the exhaust purification catalyst 13 function as an $NO_x$ storage catalyst in this way will be referred to below as "the second $NO_x$ removal method". In this second $NO_x$ removal method, as shown in FIG. 12, when the stored $NO_x$ amount ΣNOX which was stored in the basic layer 53 exceeds a predetermined allowable amount MAX, the air-fuel ratio (A/F) in of the exhaust gas which flows into the exhaust purification catalyst 13 is temporarily made rich. If the air-fuel ratio (A/F) in of the exhaust gas is made rich, when the air-fuel ratio (A/F) in of the exhaust gas is lean, the $NO_x$ which was stored in the basic layer 53 is released all at once from the basic layer 53 and reduced. Due to this, the $NO_x$ is removed.

Figure 13:
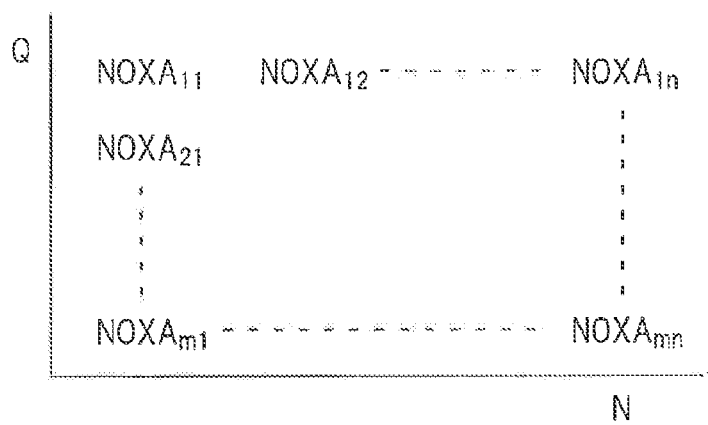
FIG. 13 is a view which shows a map of an exhausted $NO_x$ amount NOXA.

The stored $NO_x$ amount ΣNOX is for example calculated from the amount of $NO_x$ which is exhausted from the engine. In this embodiment according to the present invention, the exhausted $NO_x$ amount NOXA which is exhausted from the engine per unit time is stored as a function of the amount of depression L of the accelerator pedal 4 and the engine speed N in the form of a map such as shown in FIG. 13 in advance in the ROM 32. The stored $NO_x$ amount ΣNOX is calculated from this exhausted $NO_x$ amount NOXA. In this case, as explained above, the period by which the air-fuel ratio (A/F) in of the exhaust gas is made rich is usually 1 minute or more.

Figure 14:
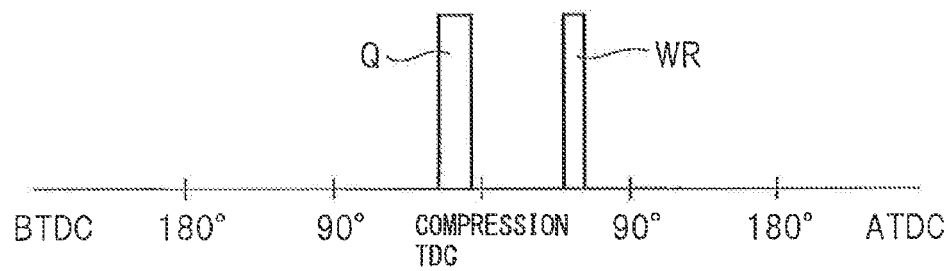
FIG. 14 is a view which shows a fuel injection timing.
Figure 15:
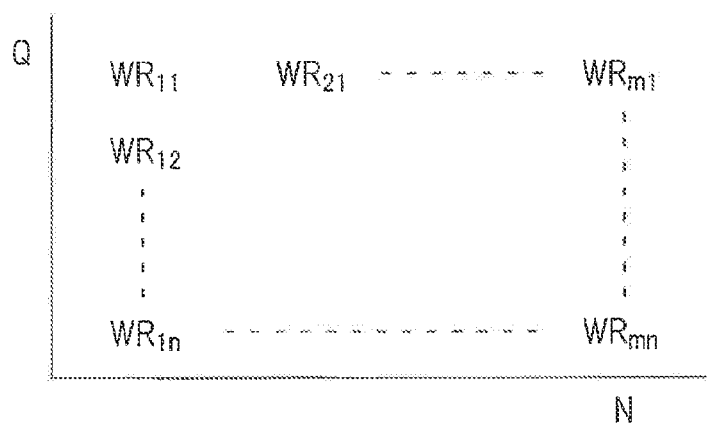
FIG. 15 is a view which shows a map of a fuel feed amount WR.

In this second $NO_x$ removal method, as shown in FIG. 14. In addition to the combustion use fuel Q from the fuel injector 2, additional fuel WR is injected into the combustion chamber 2 so that the air-fuel ratio (A/F) in of the exhaust gas which flows into the exhaust purification catalyst 13 is made rich. Note that, in FIG. 14, the abscissa shows the crank angle. This additional fuel WR is injected at a timing at which it burns, but does not appear as engine output, that is, slightly before ATDC90° after top dead center of the compression stroke. This fuel amount WR is stored as a function of the amount of depression L of the accelerator pedal 40 and the engine speed N in the form of a map such as shown in FIG. 15 in advance in the ROM 32. Of course, in this case, it is also possible to make the amount of injection of hydrocarbons from the hydrocarbon feed valve 15 increase so as to make the air-fuel ratio (A/F) in of the exhaust gas rich.

Now then, in this embodiment according to the present invention, the $NO_x$ removal action by the first $NO_x$ removal method and the $NO_x$ removal action by the second $NO_x$ removal method are selectively performed. Which of the $NO_x$ removal action by the first $NO_x$ removal method and the $NO_x$ removal action by the second $NO_x$ removal method to perform is determined for example as follows. That is, the $NO_x$ removal rate when the $NO_x$ removal action by the first $NO_x$ removal method is performed, as shown in FIG. 5, starts to rapidly fall when the temperature TC of the exhaust purification catalyst 13 becomes the limit temperature TX or less. As opposed to this, as shown in the figure, the $NO_x$ removal rate when the $NO_x$ removal action by the second $NO_x$ removal method is performed falls relatively slowly when the temperature TC of the exhaust purification catalyst 13 falls. Therefore, in this embodiment according to the present invention, when the temperature TC of the exhaust purification catalyst 13 is higher than the limit temperature TX, the $NO_x$ removal action by the first $NO_x$ removal method is performed, while when the temperature TC of the exhaust purification catalyst 13 is lower than the limit temperature TX, the $NO_x$ removal action by the second $NO_x$ removal method is performed.

Now then, the exhaust gas which is exhausted from an engine contains various particulates, but usually these particulates slip through the exhaust purification catalyst 13 and therefore these particulates will not build up on the upstream side end face of the exhaust purification catalyst 13 or inside the exhaust purification catalyst 13. However, if the above-mentioned new $NO_x$ removal method, that is, if the $NO_x$ removal by the first $NO_x$ removal method, is performed, not only the particulates which are exhausted from the engine, but also the hydrocarbons which are injected from the hydrocarbon feed valve 15 will flow into the exhaust purification catalyst 13 with a high frequency, so the upstream side end face of the exhaust purification catalyst 13 gradually increases in buildup of particulates and hydrocarbons. Note that, in this case, if referring to the particulates which are exhausted from the engine and the hydrocarbons which are injected from the hydrocarbon feed valve 15 as the "particulates in the exhaust gas", when the $NO_x$ removal action by the first $NO_x$ removal method is performed, the particulates in the exhaust gas will deposit on the upstream side end face of the exhaust purification catalyst 13.

In this regard, generally speaking, exhaust gas will not flow uniformly to the upstream side end face of the exhaust purification catalyst 13 due to the effects of the structure of the engine exhaust system etc. Further, the particulates which are exhausted from the engine and the hydrocarbons which are injected from the hydrocarbon feed valve 15, that is, the particulates in the exhaust gas, normally will not at all uniformly flow to the upstream side end face of the exhaust purification catalyst 13. That is, the particulates in the exhaust gas normally flow lopsidedly to part of the region of the upstream side end face of the exhaust purification catalyst 13. If the particulates in the exhaust gas continue to lopsidedly flow to part of the region of the upstream side end face of the exhaust purification catalyst 13 in this way, the catalyst will clog due to buildup of particulates in the exhaust gas. Next, this will be explained with reference to FIGS. 16A and 16B.

Figure 16A:
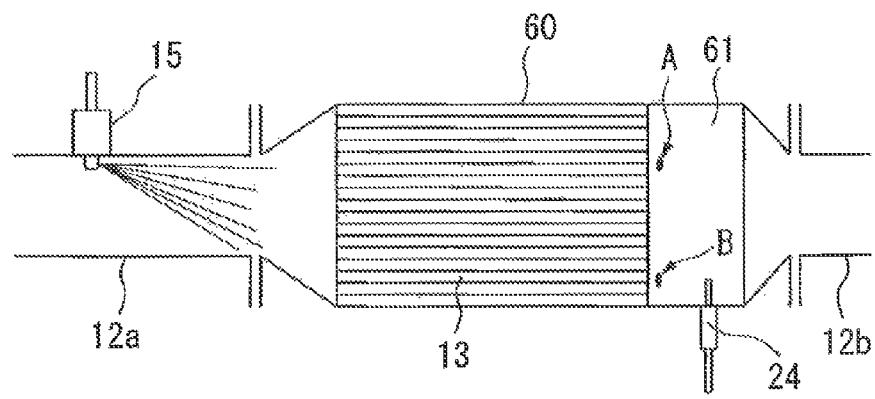
FIGS. 16A and 16B are enlarged views of the area around the exhaust purification catalyst which is shown in FIG. 1.
Figure 16B:
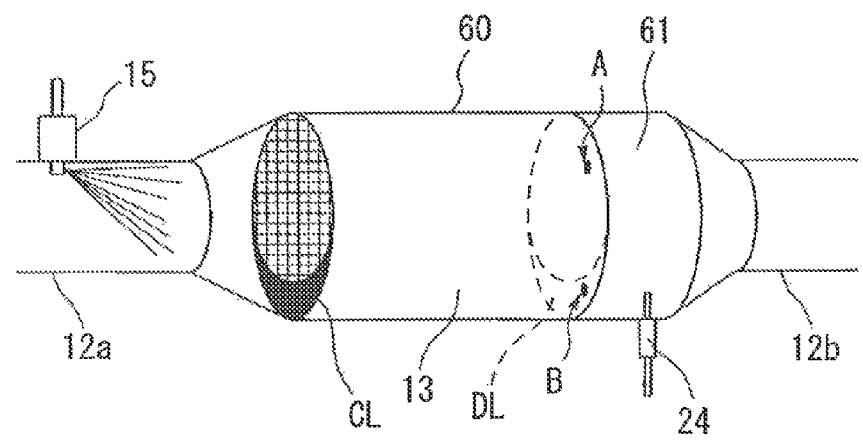

FIG. 16A is an enlarged view of the exhaust purification catalyst 13 of FIG. 1, while FIG. 16B is a perspective view of FIG. 16A. In the embodiment according to the present invention, as shown in FIGS. 16A and 16B, the exhaust purification catalyst 13 is housed inside a tubular casing 60. At the back end of the inside of the casing 60, a sensor arrangement space 61 which has a diameter the same as the downstream side end face of the exhaust purification catalyst 13 is formed. As will be understood from FIGS. 16A and 16B, a temperature sensor 24 is arranged in this sensor arrangement space 61. Further, as will be understood from FIGS. 16A and 16B, in this embodiment of the present invention, the exhaust purification catalyst 13 is comprised of a straight flow type catalyst which has a plurality of exhaust flow passages which extend in an axial direction of the exhaust purification catalyst 13. The exhaust gas which flows from the upstream side end face of the exhaust purification catalyst 13 to the exhaust purification catalyst 13 flows inside the exhaust flow passages inside of the exhaust purification catalyst 13 straight along the axis of the exhaust purification catalyst 13 and flows out from the downstream side end face of the exhaust purification catalyst 13.

Figure 17A:
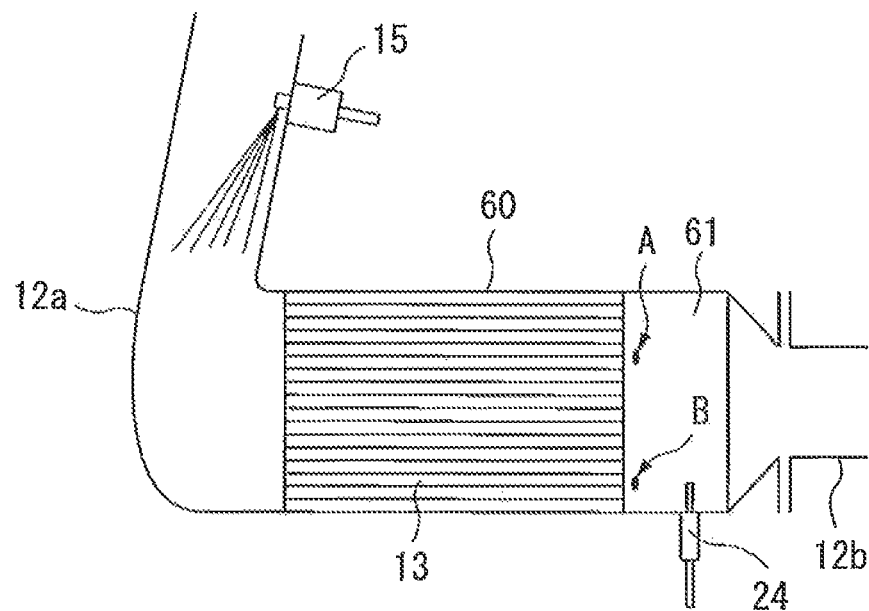
FIGS. 17A and 17B are enlarged views of the area around the exhaust purification catalyst which shows another embodiment.
Figure 17B:
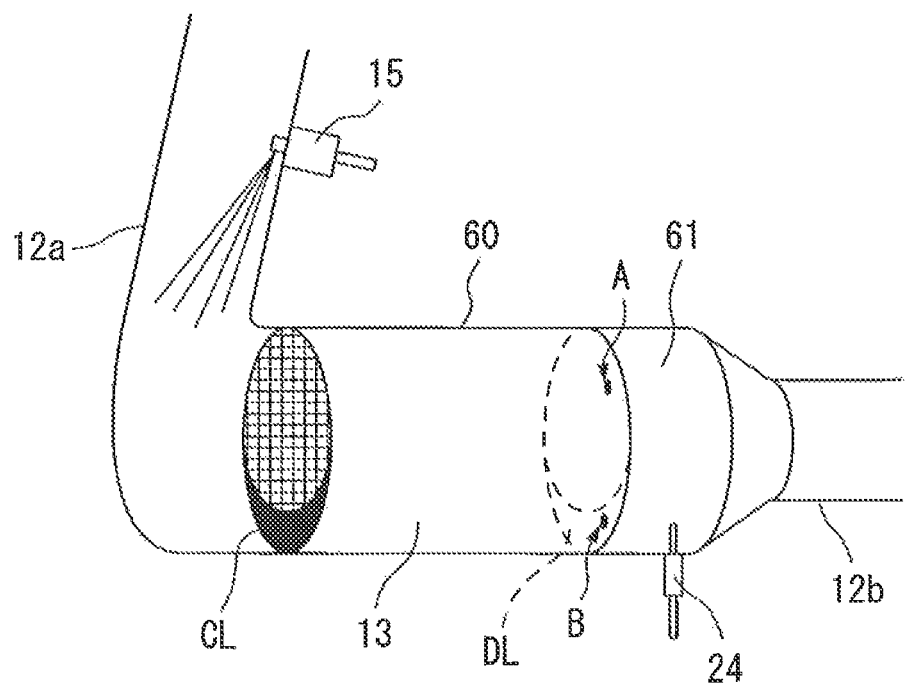

Now then, the particulates in the exhaust gas in many cases flow lopsidedly to a certain part of the peripheral region of the upstream side end face of the exhaust purification catalyst 13. FIGS. 16A and 16B show the case where the particulates in the exhaust gas flow lopsidedly to a lower region CL of the peripheral area of the upstream side end face of the exhaust purification catalyst 13 and, as a result, the lower region CL of the peripheral area of the upstream side end face of the exhaust purification catalyst 13 clogs due to buildup of particulates in the exhaust gas. Normally, if the structure of the engine exhaust system or the mounting position of the hydrocarbon feed valve 15 is determined, a clogging region CL at the upstream side end face of the exhaust purification catalyst 13 is inevitably correspondingly determined. FIGS. 17A and 17B show a specific example where the exhaust pipe 12a is bent by 90 degrees or more in front of the upstream side end face of the exhaust purification catalyst 13 and where the hydrocarbon feed valve 15 is attached upstream from this bent part. In this specific example, it can be easily understood that a clogged region CL is formed at the peripheral part of the upstream side end face of the exhaust purification catalyst 13 in a direction opposite to the direction in which the exhaust pipe 12a extends.

In this way, it is possible to predict the limited part of the region at the peripheral area of the upstream side end face of the exhaust purification catalyst 13 where there is a possibility of clogging occurring due to buildup of particulates in the exhaust gas. Therefore, an embodiment according to the present invention predicts the limited part of the region CL of the peripheral area of the upstream side end face of the exhaust purification catalyst 13 where there is a possibility of clogging occurring due to buildup of particulates in the exhaust gas as the "particulate buildup region". In this case, in actuality, this particulate buildup region CL is found by experiments.

Further, in an embodiment of the present invention, the exhaust purification catalyst 13 is comprised of a straight flow type of catalyst which has a plurality of exhaust flow passages which extend in the axial direction of the exhaust purification catalyst 13. Therefore, in FIGS. 16B and 17B, the exhaust gas which flows from the particulate buildup region CL to the exhaust flow passages of the exhaust purification catalyst 13 flows out from the corresponding region DL on the downstream side end face of the exhaust purification catalyst 13 which is positioned at the opposite side from the particulate buildup region CL on the longitudinal axis of the exhaust purification catalyst 13.

Now then, when the $NO_x$ removal action by the first $NO_x$ removal method is being performed, the majority of the hydrocarbons which is injected from the hydrocarbon feed valve 15 is used for consumption of oxygen in the exhaust purification catalyst 13. Only the remaining part of the hydrocarbons is used for producing the reducing intermediate. In this case, even if the amount of hydrocarbons which flow into the exhaust purification catalyst 13 decreases, the amount of hydrocarbons which is used for consumption of oxygen does not change. At this time, the amount of hydrocarbons which is used for producing the reducing intermediate decreases. Therefore, if the amount of hydrocarbons which flows into the exhaust purification catalyst 13 decreases, the amount of production of the reducing intermediate decreases and as a result the $NO_x$ removal rate falls.

Now then, if part of the region of the upstream side end face of the exhaust purification catalyst 13, that is, the particulate buildup region CL, clogs due to buildup of particulates, the amount of hydrocarbons which flow into the exhaust purification catalyst 13 decreases. As a result, as explained above, the amount of production of the reducing intermediate decreases and the $NO_x$ removal rate falls. In this way, when the $NO_x$ removal action by the first $NO_x$ removal method is performed, if the amount of hydrocarbons which flows into the exhaust purification catalyst 13 slightly decreases, the $NO_x$ removal rate greatly falls. Therefore, if just part of the region of the upstream side end face of the exhaust purification catalyst 13 clogs due to buildup of particulates, the $NO_x$ removal rate will greatly fall.

That is, when the exhaust purification catalyst 13 clogs due to buildup of particulates, even if performing the $NO_x$ removal action by the first $NO_x$ removal method, the $NO_x$ is liable to be unable to be reliably removed. Further, the hydrocarbons which are injected from the hydrocarbon feed valve 15 are liable to be unable to be effectively utilized for $NO_x$ removal. Furthermore, sticking of the particulates in the exhaust gas to the particulates which form the clogging is promoted and the clogging which occurs at the exhaust purification catalyst 13 is liable to expand.

Therefore, in an embodiment of the present invention, it is judged if the exhaust purification catalyst 13 is clogged due to buildup of particulates in the exhaust gas and, when it is judged that the exhaust purification catalyst 13 is clogged, the $NO_x$ removal action by the second $NO_x$ removal method is performed.

In this regard, when the catalyst temperature TC is considerably high, as will be understood from FIG. 9, it is difficult to obtain a high $NO_x$ removal rate by the second $NO_x$ removal method. Therefore, in an embodiment according to the present invention, when it is judged that the exhaust purification catalyst 13 is clogged, it is judged if the catalyst temperature TC is lower than a predetermined set temperature and, when it is judged that the catalyst temperature TC is lower than the set temperature, the $NO_x$ removal action by the second $NO_x$ removal method is performed. On the other hand, when it is judged that the catalyst temperature TC is higher than the set temperature, end face regeneration processing is performed to remove the particulates which have built up on the exhaust purification catalyst 13. As a result, the clogging of the exhaust purification catalyst 13 is removed. Therefore, the $NO_x$ removal action by the first $NO_x$ removal method is allowed and the $NO_x$ can be reliably removed.

In end face regeneration processing, temperature control is performed to make the temperature of the upstream side end face of the exhaust purification catalyst 13 rise, then maintain it at 500° C. or more, preferably 600° C. or more. In an embodiment according to the present invention, to make the air-fuel ratio (A/F) in of the exhaust gas temporarily rich, additional fuel is injected from the fuel injector 3 or hydrocarbons are injected from the hydrocarbon feed valve 15. As a result, the exhaust gas is raised in temperature and the high temperature exhaust gas is used to raise the upstream side end face of the exhaust purification catalyst 13 in temperature. In other words, in this embodiment, temperature raising control is performed under a rich air-fuel ratio. Next, when the temperature raising control ends, the air-fuel ratio (A/F) in of the exhaust gas is returned to lean. As a result, a large amount of oxygen is supplied to the high temperature exhaust purification catalyst 13 and therefore the particulates which form the clogging are removed by oxidation. Note that, in the temperature raising control of this embodiment, the air-fuel ratio (A/F) in of the exhaust gas is made rich, so the $NO_x$ which is stored in the exhaust purification catalyst 13 is released.

In another embodiment according to the present invention, temperature raising control is performed by injecting additional fuel from the fuel injector 3 or injecting hydrocarbons from the hydrocarbon feed valve 15 so that the air-fuel ratio (A/F) in of the exhaust gas is maintained lean. In other words, temperature raising control is performed under a lean air-fuel ratio. In this other embodiment as well, the particulates which form the clogging are removed by oxidation. However, if performing temperature raising processing under a rich air-fuel ratio, it is possible to raise the temperature of the exhaust purification catalyst more quickly than with temperature raising control under a lean air-fuel ratio.

In an embodiment according to the present invention, when the catalyst temperature TC is higher than the set temperature, end face regeneration processing is performed, so the upstream side end face of the exhaust purification catalyst 13 can be quickly raised in temperature.

On the other hand, in an embodiment according to the present invention, the pressure PCu upstream of the exhaust purification catalyst 13 inside the exhaust pipe 12a and the differential pressure ΔPF across the particulate filter 14 are used as the basis to judge if the exhaust purification catalyst 13 is clogged due to buildup of particulates in the exhaust gas. This will be explained with reference to FIG. 18.

Figure 18:
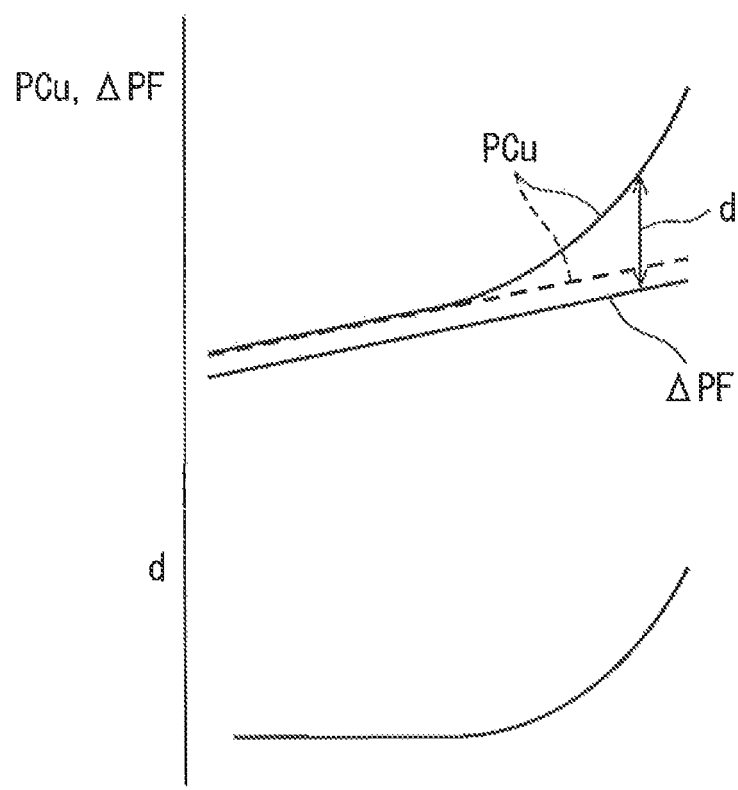
FIG. 18 is a view which shows changes in the pressure inside the exhaust pipe and the differential pressure across a particulate filter.

FIG. 18 shows the changes in the pressure PCu inside the exhaust pipe 12a and the differential pressure ΔPF across the particulate filter 14. As shown in FIG. 18 by the solid line, the pressure PCu inside of the exhaust pipe 12a increases a little at a time when the vehicle travel distance is low and the exhaust purification catalyst 13 is not clogged due to buildup of particulates in the exhaust gas and increases rapidly when the vehicle travel distance is high and the exhaust purification catalyst 13 clogs. As opposed to this, even when the vehicle travel distance becomes high, the differential pressure ΔPF across the particulate filter 14 increases by a substantially constant ratio. Therefore, the difference "d" (=PCu−ΔPF) between the pressure PCu inside of the exhaust pipe 12 and the differential pressure ΔPF across the particulate filter 14 rapidly increases if the exhaust purification catalyst 13 becomes clogged.

Therefore, in an embodiment according to the present invention, when the difference "d" is larger than an allowable upper limit value, it is judged that the exhaust purification catalyst 13 is clogged due to buildup of particulates, while when the difference "d" is smaller than the allowable upper limit, it is judged that the exhaust purification catalyst 13 is not clogged due to buildup of particulates. Note that, in FIG. 18, the broken line shows the pressure PCu inside of the exhaust pipe 12a when the exhaust purification catalyst 13 is not clogged.

A particulate filter 14 is usually provided with a differential pressure sensor 26. Therefore, by just providing a pressure sensor 25, it becomes possible to judge if the exhaust purification catalyst 13 is clogged due to buildup of particulates.

Figure 19:
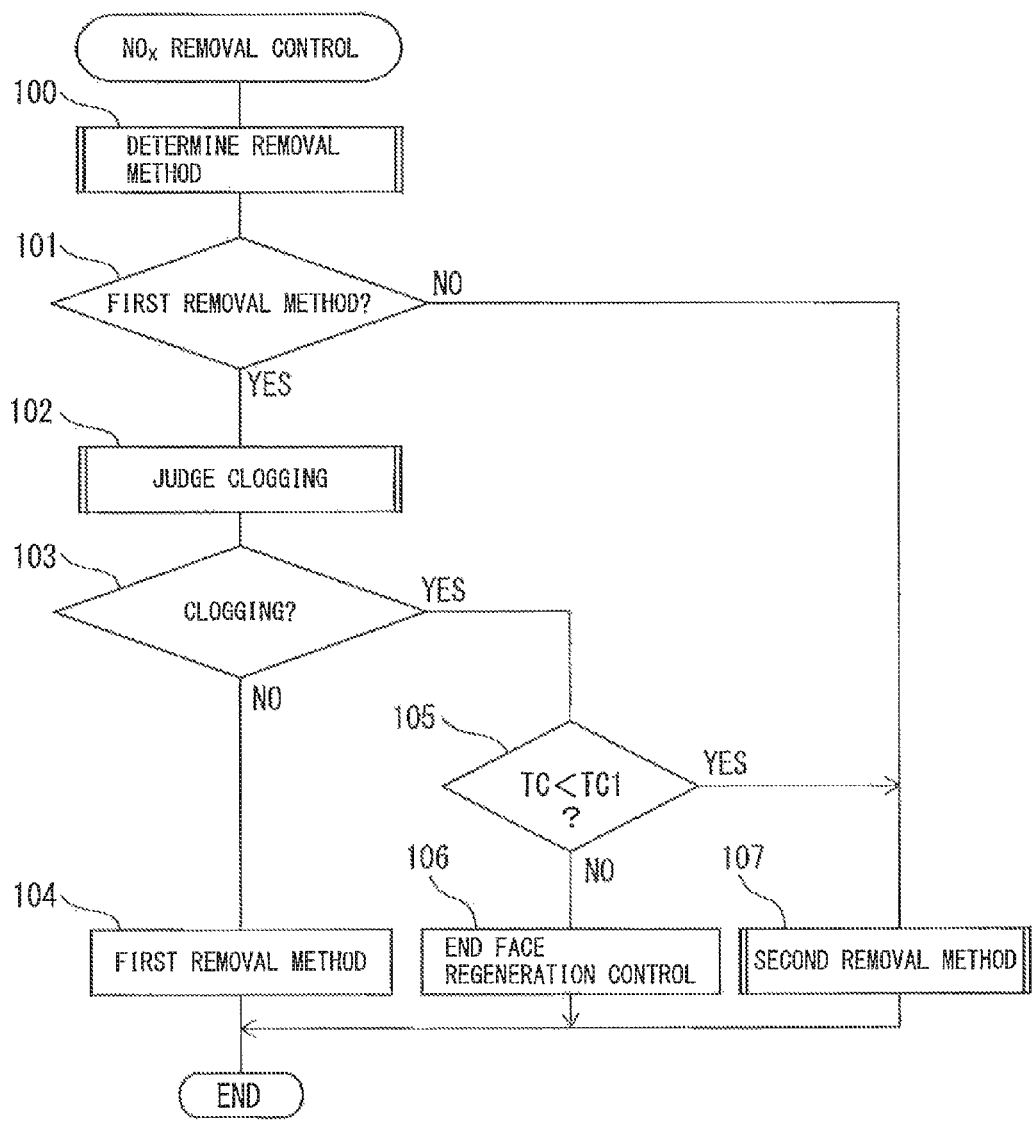
FIG. 19 is a flow chart for performing $NO_x$ removal control.

FIG. 19 snows the $NO_x$ removal control routine for performing an $NO_x$ removal control method of an embodiment according to the present invention. This routine is performed by interruption every predetermined time period.

Figure 20:
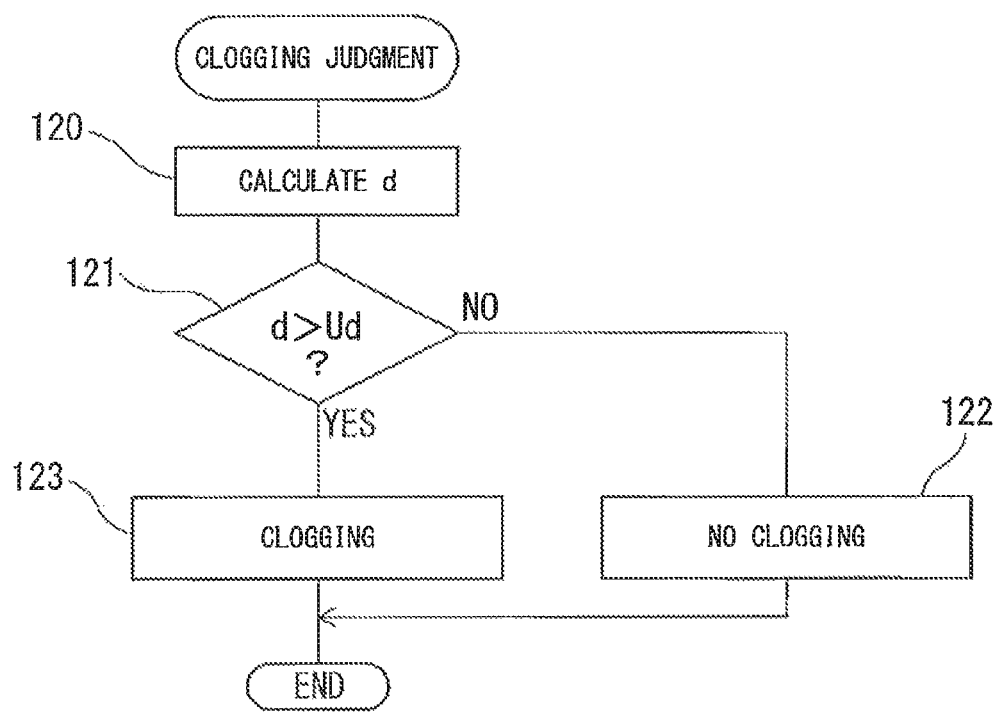
FIG. 20 is a flow chart for judging clogging.

Referring to FIG. 19, first, to start, at step 100, it is determined which of the $NO_x$ removal action by the first $NO_x$ removal method and the $NO_x$ removal action by the second $NO_x$ removal method to perform. Next, at step 101, it is judged if the $NO_x$ removal action by the first $NO_x$ removal method should be performed. When the $NO_x$ removal action by the first $NO_x$ removal method should be performed, the routine proceeds to step 102 where a routine is performed for judging if the exhaust purification catalyst 13 is clogged due to buildup of particulates in the exhaust gas. This routine is shown in FIG. 20. Next at step 103, it is judged if the exhaust purification catalyst 13 is clogged due to buildup of particulates in the exhaust gas. When it is judged that the exhaust purification catalyst 13 is not clogged due to buildup of particulates in the exhaust gas, the routine proceeds to step 104 where the $NO_x$ removal action by the first $NO_x$ removal method is performed. That is, the hydrocarbon feed valve 15 injects the amount of injection W of hydrocarbons which is shown in FIG. 11 in accordance with the operating state of the engine by a predetermined injection timing ΔT.

Figure 21:
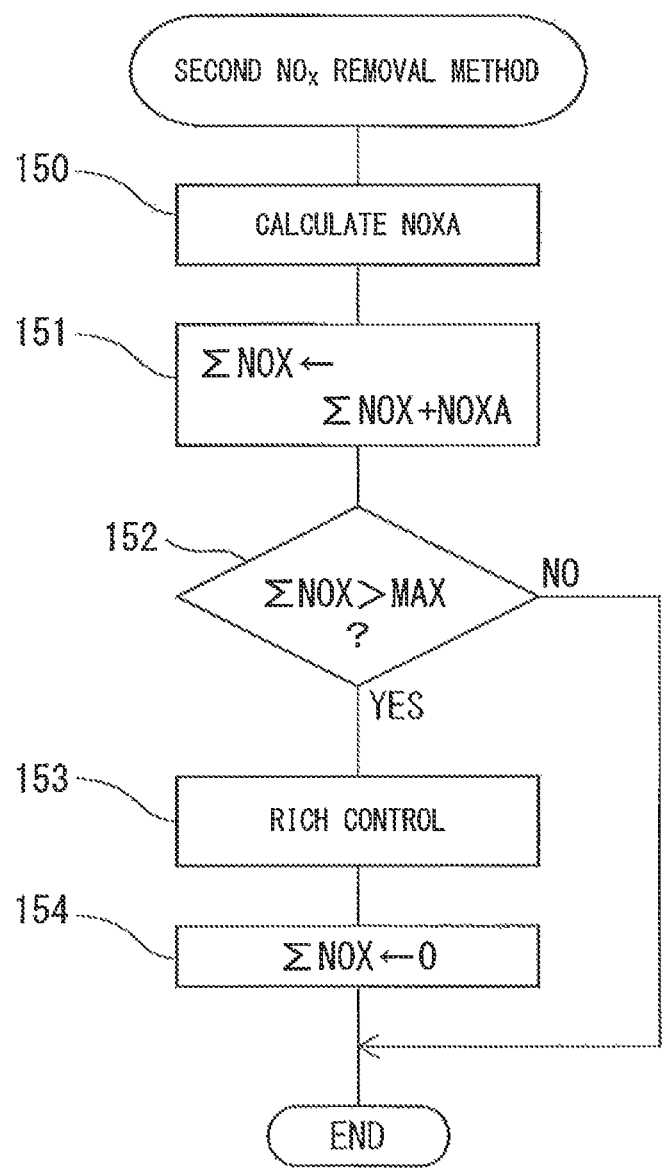
FIG. 21 is a flow chart for performing a second $NO_x$ removal method.

On the other hand, when it is judged at step 103 that the exhaust purification catalyst 13 is clogged due to buildup of particulates in the exhaust gas, the routine proceeds to step 105 where it is judged if the catalyst temperature TC is lower than the set temperature TC1. When TC≥TC1, the routine proceeds to step 106 where end face regeneration control is performed. As opposed to this, when TC<TC1, the routine proceeds to step 107 where a routine for performing the $NO_x$ removal action by the second $NO_x$ removal method is performed. This routine is shown in FIG. 21.

When at step 101 the $NO_x$ removal action by the second $NO_x$ removal method should be performed, the routine proceeds to step 107.

FIG. 20 shows a routine for judging clogging which is executed at step 102 of FIG. 19.

Referring to FIG. 20, first, to start, at step 120, the difference "d" (=PCu−ΔPF) is calculated. Next, at step 121, it is judged if the difference "d" is larger than an allowable upper limit value Ud. When d≤Ud, the routine proceeds to step 122 where it is judged that the exhaust purification catalyst 13 is not clogged due to buildup of particulates in the exhaust gas. As opposed to this, when d>Ud, the routine proceeds to step 123 where it is judged that the exhaust purification catalyst 13 is clogged due to buildup of particulates in the exhaust gas.

FIG. 21 shows the routine for performing the $NO_x$ removal action by the second $NO_x$ removal method which is performed at step 107 of FIG. 19.

Referring to FIG. 21, first, to start, at step 150, the $NO_x$ amount NOXA which is exhausted per unit time is calculated from the map which is shown in FIG. 13. Next at step 151, the exhausted $NO_x$ amount NOXA is added to ΣNOX to calculate the stored $NO_x$ amount ΣNOX. Next, at step 152, it is judged if the stored $NO_x$ amount ΣNOX has exceeded the allowable value MAX. If ΣNOX>MAX, the routine proceeds to step 153 where the amount of additional fuel WP is calculated from the map which is shown in FIG. 15 and the action for injection of the additional fuel is performed. At this time, the exhaust gas which flows into the exhaust purification catalyst 13 is made rich in air-fuel ratio (A/F) in. Next, at step 154, ΣNOX is cleared.

Next, another embodiment for judging if the exhaust purification catalyst 13 is clogged due to buildup of particulates in the exhaust gas will be explained.

If the exhaust purification catalyst 13 becomes clogged due to buildup of particulates in the exhaust gas, the differential pressure across the exhaust purification catalyst 13 becomes larger. Therefore, it is judged if the differential pressure across the exhaust purification catalyst 13 has exceeded the allowable upper limit. When it is judged that the differential pressure across the exhaust purification catalyst 13 has exceeded the allowable upper limit, it is judged that the exhaust purification catalyst 13 is clogged due to buildup of particulates. As opposed to this, when it is judged that the differential pressure across the exhaust purification catalyst 13 is smaller than the allowable upper limit, it is judged that the exhaust purification catalyst 13 is not clogged due to buildup of particulates in the exhaust gas.

Figure 22A:
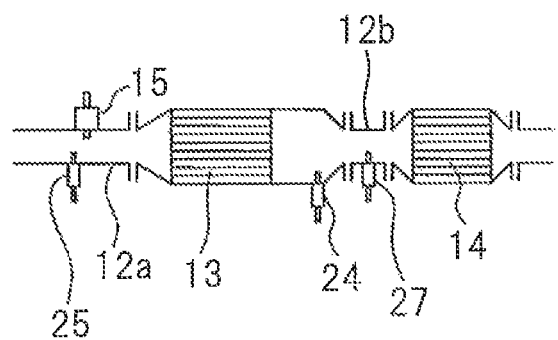
FIGS. 22A and 22B are views which show another embodiment of clogging judgment.
Figure 22B:
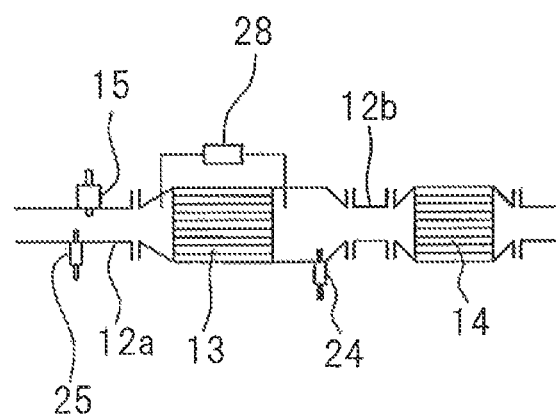

To detect the differential pressure across the exhaust purification catalyst 13, in the embodiment which is shown in FIG. 22A, a pressure sensor 25 which detects the pressure upstream of the exhaust purification catalyst 13 inside the exhaust pipe 12a and a pressure sensor 27 which detects the pressure downstream of the exhaust purification catalyst 13 inside the exhaust pipe 12b are respectively provided. In the embodiment which is shown in FIG. 22B, a differential pressure sensor 28 is provided for detecting the differential pressure across the exhaust purification catalyst 13.

Note that, in the embodiment which is shown in FIG. 1, when the difference "d" (=PCu−ΔPF) between the pressure PCu inside of the exhaust pipe 12a and the differential pressure ΔPF across the particulate filter 14 is larger than the allowable upper limit Ud, the differential pressure across the exhaust purification catalyst 13 can be considered to be larger than the allowable upper limit, while when the difference "d" is smaller than the allowable upper limit Ud, the differential pressure across the exhaust purification catalyst 13 can be considered to be smaller than the allowable upper limit.

Next, still another embodiment for judging if the exhaust purification catalyst 13 is clogged due to buildup of particulates in the exhaust gas will be explained.

Figure 23A:
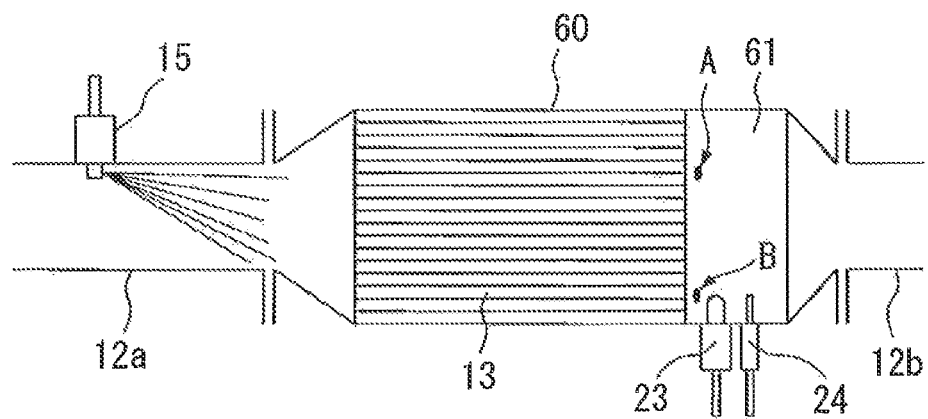
FIGS. 23A and 23B are enlarged views of the area around the exhaust purification catalyst in another embodiment according to the present invention.
Figure 23B:
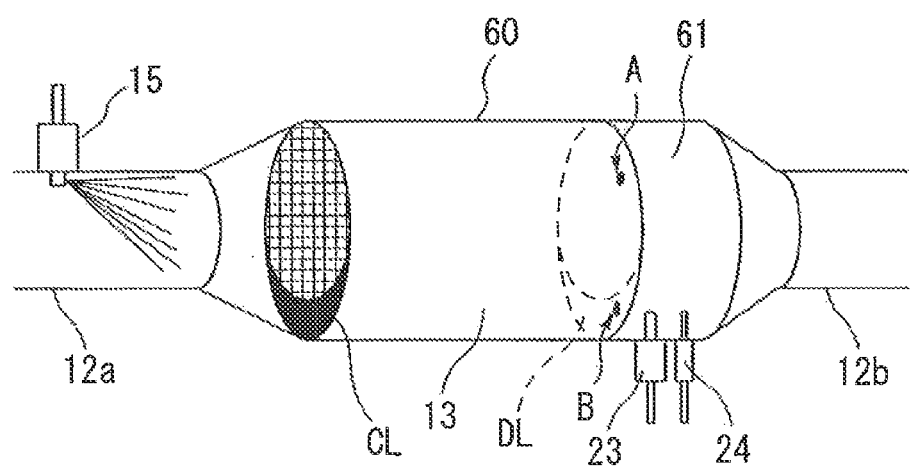
Figure 24A:
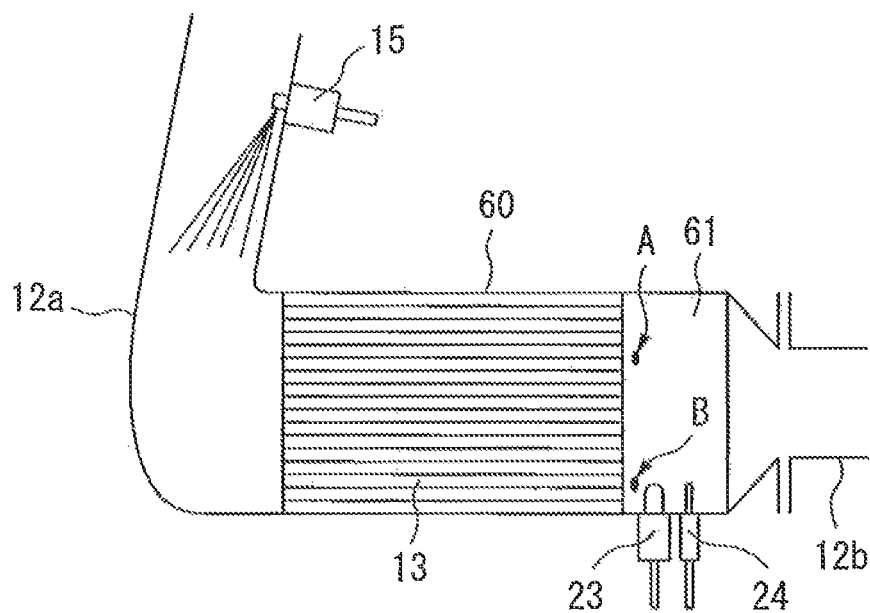
FIGS. 24A and 24B are enlarged views of the area around the exhaust purification catalyst which shows another embodiment.
Figure 24B:
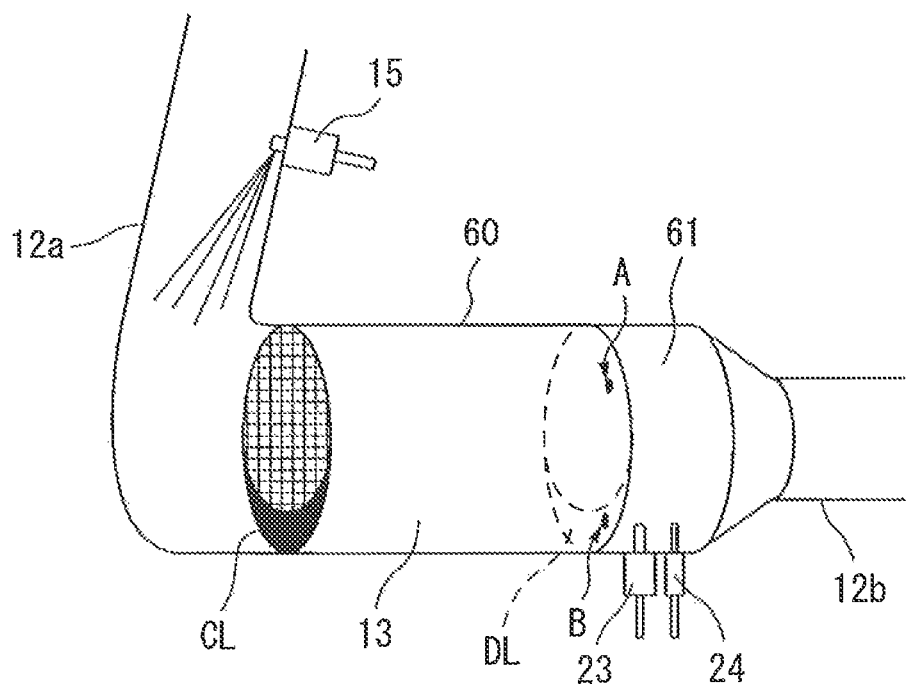

In still another embodiment of clogging judgment, the air-fuel ratio sensor 2 is arranged downstream of the exhaust purification catalyst 13. That is, in the example which is shown in FIGS. 23A and 23B which correspond to FIGS. 16A and 16B, an air-fuel ratio sensor 23 is arranged together with a temperature sensor 24 inside of the sensor arrangement space 61. Further, in the example which is shown in FIGS. 24A and 24B corresponding to FIGS. 17A and 17B as well, an air-fuel ratio sensor 23 is arranged inside of the sensor arrangement space 61. Furthermore, the air-fuel ratio sensor 23 is arranged immediately downstream of the corresponding region DL on the downstream side end face of the exhaust purification catalyst 13. That is, in still another embodiment of clogging judgment, the air-fuel ratio sensor 23 is arranged downstream of the peripheral part of the downstream side end face of the exhaust purification catalyst 13 inside the exhaust gas flow region corresponding to the downstream side of the particulate buildup region CL when viewed along the longitudinal axis of the exhaust purification catalyst 13.

Now then, in still another embodiment of clogging judgment, the blockage rate of the upstream side end face of the exhaust purification catalyst 13 is used as the basis to judge if the exhaust purification catalyst 13 is clogged due to buildup of particulates in the exhaust gas. Specifically, until the blockage rate of the upstream side end face of the exhaust purification catalyst 13 becomes a constant rate, it is judged that the exhaust purification catalyst 13 is not clogged due to buildup of particulates in the exhaust gas, while when the blockage rate of the upstream side end face of the exhaust purification catalyst 13 becomes the constant rate, it is judged that the exhaust purification catalyst 13 is clogged due to buildup of particulates in the exhaust gas. This will be explained with reference to FIG. 25.

Figure 25:
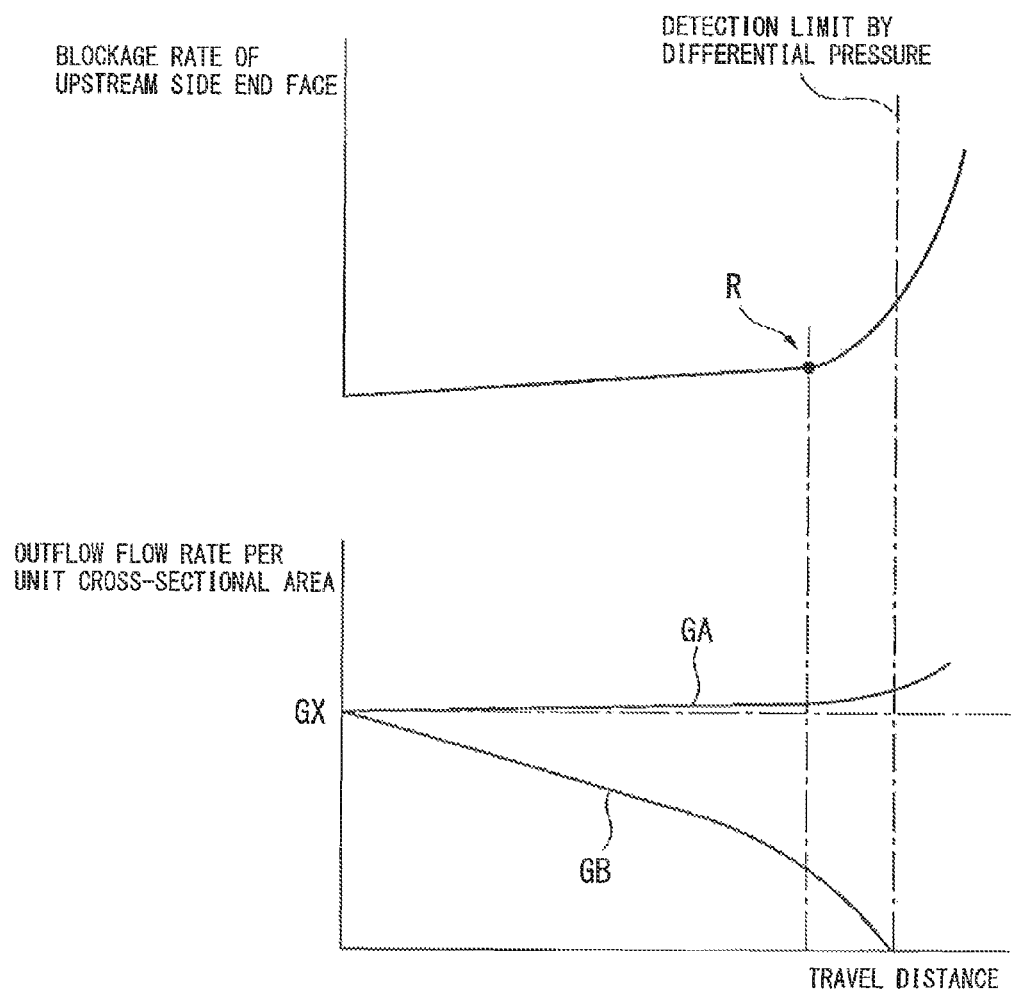
FIG. 25 is a view which shows changes in an end face blockage rate and a flow rate per unit cross-sectional area.

FIG. 25 shows the change in the blockage rate of the upstream side end face of the exhaust purification catalyst 13 with respect to the vehicle travel distance and the change in the outflow flow rate per unit cross-sectional area from the downstream side end face of the exhaust purification catalyst 13 downstream of particulate buildup region CL. As shown in FIG. 25, as the vehicle travel distance rises, the blockage rate of the upstream side end face of the exhaust purification catalyst 13 first increases a little at a time. After passing a certain point of time R, it begins to rapidly increase. In still another embodiment of clogging judgment, when the blockage rate of the upstream side end face of the exhaust purification catalyst 13 reaches this point R, it is judged that the exhaust purification catalyst 13 is clogged due to buildup of particulates in the exhaust gas.

In this regard, even if part of the region of the upstream side end face of the exhaust purification catalyst 13, that is, the particulate buildup region CL, clogs slightly due to buildup of particulates, the differential pressure across the exhaust purification catalyst 13 will not change that much. The differential pressure across the exhaust purification catalyst 13 becomes larger and clogging of the upstream side end face of the exhaust purification catalyst 13 can be detected when the amount of particulates which builds up at the upstream side end face of the exhaust purification catalyst 13 becomes considerably great. Note that, FIG. 25 shows the detection limit at which the differential pressure across the exhaust purification catalyst 13 can be used to detect clogging of the upstream side end face of the exhaust purification catalyst 13. From FIG. 25, the blockage rate of the upstream side end face of the exhaust purification catalyst 13 at the point R becomes considerably lower than the blockage rate which can be detected by the differential pressure across the exhaust purification catalyst 13, therefore it is not possible to use the differential pressure across the exhaust purification catalyst 13 to judge if the blockage rate of the upstream side end face of the exhaust purification catalyst 13 has reached the point R.

On the other hand, in FIG. 25, GX shows the outflow flow rate per unit cross-sectional area from the downstream side end face of the exhaust purification catalyst 13 when the upstream side end face of the exhaust purification catalyst 13 has no particulates built up there at all, while GA and GB, as shown from FIG. 23A to FIG. 24B, show the outflow flow rates per unit cross-sectional area from the downstream side end face of the exhaust purification catalyst 13 when the particulate buildup region CL of the upstream side end face of the exhaust purification catalyst 13 is clogged due to buildup of particulates. Note that, GA shows the outflow flow rate from the corresponding region on the downstream side end face of the exhaust purification catalyst 13 which is positioned at the opposite side to the region of the upstream side end face where particulates have not built up on the longitudinal axis of the exhaust purification catalyst 13, that is, the outflow flow rate at the point A in FIG. 23A to FIG. 24B, while GB shows the outflow flow rate from the corresponding region DL on the downstream side end face of the exhaust purification catalyst 13 which is positioned at the opposite side to the particulate buildup region CL on the longitudinal axis of the exhaust purification catalyst 13, that is, the outflow flow rate at the point B in FIG. 23A to FIG. 24B.

As will be understood from FIG. 25, even if the vehicle travel distance rises and the particulate buildup region CL of the upstream side end face of the exhaust purification catalyst 13 is clogged due to buildup of particulates, the outflow flow rate GA at the point A of FIG. 23A to FIG. 25B only increases slightly from the outflow flow rate GX, while the outflow flow rate GB at the point B of FIG. 23A to FIG. 25B greatly decreases from the outflow flow rate GX. In this case, if making the exhaust gas which flows into the exhaust purification catalyst 13 instantaneously change in air-fuel ratio, a difference arises in the change of the air-fuel ratio of the exhaust gas which flows out from the exhaust purification catalyst 13 in accordance with the deviation in the outflow flow rate from: the outflow flow rate GX. That is, in the case where, like in point A of FIG. 23A to FIG. 23B, the outflow flow rate GA is not deviated much at all from the outflow flow rate GX, when making the exhaust gas which flows into the exhaust purification catalyst 13 instantaneously change in air-fuel ratio, the exhaust gas also instantaneously changes in air-fuel ratio at the point A of FIG. 23A to FIG. 24B. As opposed to this, in the case where, like in point B of FIG. 23A to FIG. 24b, the outflow flow rate GB greatly decreases from the outflow flow rate GX, even if the exhaust gas which flows into the exhaust purification catalyst 13 is made to instantaneously change in air-fuel ratio, the exhaust gas will not instantaneously change in air-fuel ratio at the point B of FIG. 23A to FIG. 24B.

That is, the exhaust gas instantaneously changes in air-fuel ratio at the point A from FIG. 23A to FIG. 24B when making the exhaust gas which flows into the exhaust purification catalyst 13 instantaneously change in air-fuel ratio both when the particulate buildup region CL of the upstream side end face of the exhaust purification catalyst 13 is clogged due to buildup of particulates and when it is not. Therefore, it is not possible to judge if the particulate buildup region CL of the upstream side end face of the exhaust purification catalyst 13 is clogged due to buildup of particulates using the method of changing of the air-fuel ratio of the exhaust gas at the point A of FIG. 23A to FIG.

24B when making the exhaust gas which flows into the exhaust purification catalyst 13 instantaneously change in air-fuel ratio.

On the other hand, the exhaust gas instantaneously changes in air-fuel ratio at the point B from FIG. 23A to FIG. 24 when making the exhaust gas which flows into the exhaust purification catalyst 13 instantaneously change in air-fuel ratio when the particulate buildup region CL of the upstream side end face of the exhaust purification catalyst 13 is not clogged due to buildup of particulates. As opposed to this, the exhaust gas does not instantaneously change in air-fuel ratio at the point B from FIG. 23A to FIG. 24B when making the exhaust gas which flows into the exhaust purification catalyst 13 instantaneously change in air-fuel ratio when the particulate buildup region CL of the upstream side end face of the exhaust purification catalyst 13 is clogged due to buildup of particulates.

Therefore, it becomes possible to judge if the particulate buildup region CL of the upstream side end face of the exhaust purification catalyst 13 is clogged due to buildup of particulates using the method of changing of the air-fuel ratio of the exhaust gas at the point B of FIG. 23A to FIG. 24B when making the exhaust gas which flows into the exhaust purification catalyst 1 instantaneously change in air-fuel ratio.

Therefore, in still another embodiment of clogging judgment, to enable detection of change of the air-fuel ratio of the exhaust gas at the point B of FIG. 23A to FIG. 24B, an air-fuel ratio sensor 23 is arranged downstream of the corresponding region DL on the downstream side end face of the exhaust purification catalyst 13 which is positioned at the opposite side to the particulate buildup region CL on the longitudinal axis of the exhaust purification catalyst 13 and the change in output value of this air-fuel ratio sensor 23 is used to judge if the particulate buildup region CL of the upstream side end face of the exhaust purification catalyst 13 is clogged due to buildup of particulates. Next, the way of change of the output value of the air-fuel ratio sensor 23 when making the exhaust gas which flows into the exhaust purification catalyst 13 instantaneously change in air-fuel ratio will be explained, but before that, the characteristics of two types of air-fuel ratio sensors 23 which are used in still other embodiments of clogging judgment will be explained simply with reference to FIGS. 26A and 26B.

Figure 26A:
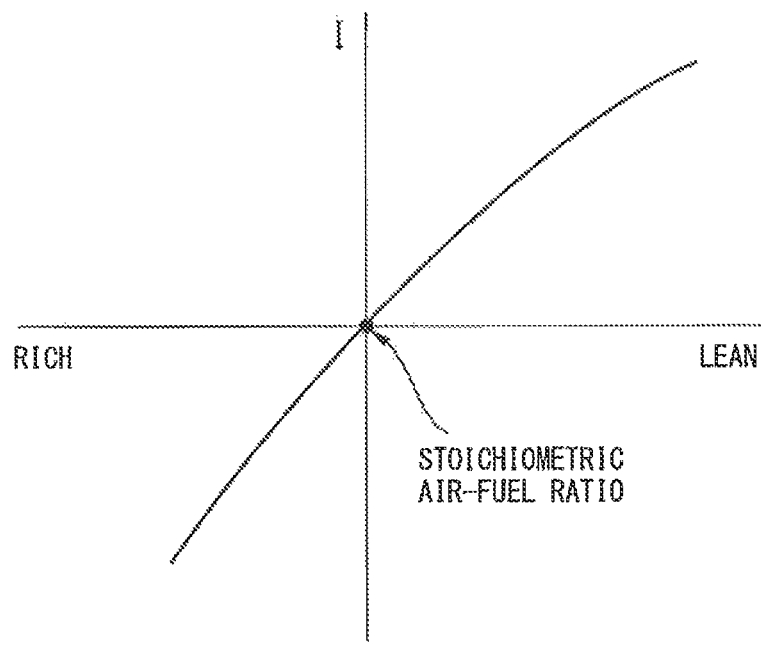
FIGS. 26A and 26B are views which show changes in the output value of an air-fuel ratio sensor.
Figure 26B:
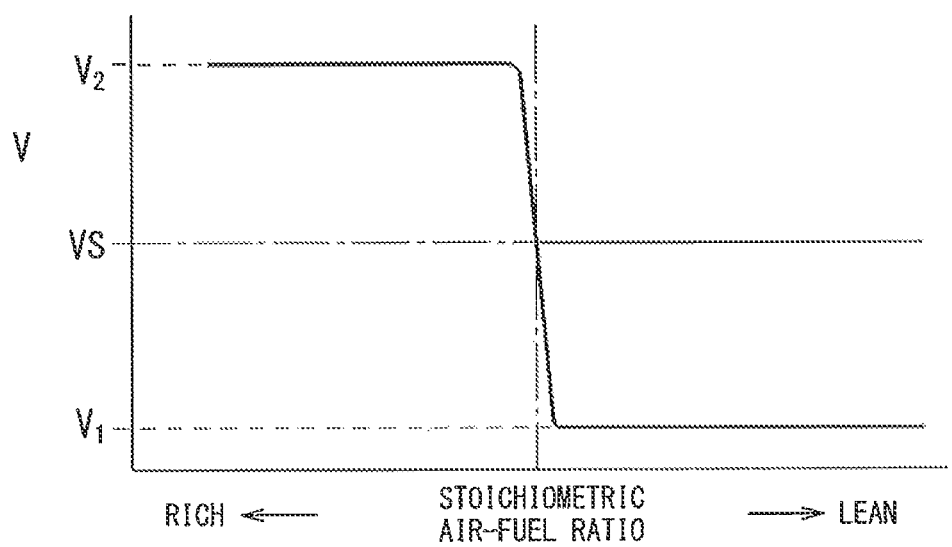

FIG. 26A shows the relationship between the output current I of a limit current type of air-fuel ratio sensor and an air-fuel ratio of the exhaust gas. As shown in FIG. 26A, the output current I of this limit current type of air-fuel ratio sensor increases as the exhaust gas becomes larger in air-fuel ratio. Note that, in actuality, the change in this output current I is read into the electronic control unit 30 from the air-fuel ratio sensor 23 in the form of a change of voltage. On the other hand, FIG. 26B shows the relationship between the output voltage V of the air-fuel ratio sensor called the "oxygen concentration sensor" and the air-fuel ratio of the exhaust gas. As shown in FIG. 26B, the output voltage V of this air-fuel ratio sensor becomes a lower voltage V1 of an extent of 0.1(V) if the air-fuel ratio of the exhaust gas becomes larger than the stoichiometric air-fuel ratio and becomes a higher voltage V1 of an extent of 0.9(V) if the air-fuel ratio of the exhaust gas becomes smaller than the stoichiometric air-fuel ratio.

FIG. 27 shows the change of the output voltage of the air-fuel ratio sensor 23 when using an air-fuel ratio sensor 23 constituted by a limit current type of air-fuel ratio sensor which has the output characteristic which is shown in FIG. 26A and making the exhaust gas which flows into the exhaust purification catalyst 13 instantaneously change in air-fuel ratio (A/F). Note that, in FIG. 27, VO shows the change in the output voltage of the air-fuel ratio sensor 23 when the particulate buildup region CL of the upstream side end face of the exhaust purification catalyst 13 is not clogged due to buildup of particulates, while VX shows the change in the output voltage of the air-fuel ratio sensor 23 when the particulate buildup region CL of the upstream side end face of the exhaust purification catalyst 13 is clogged due to buildup of particulates.

From FIG. 27, it is learned that when the particulate buildup region CL of the upstream side end face of the exhaust purification catalyst 13 is not clogged due to buildup of particulates, if the exhaust gas which flows into the exhaust purification catalyst 13 is made to instantaneously change in air-fuel ratio, the output voltage Vo of the air-fuel ratio sensor 23 will also instantaneously change, while when the particulate buildup region CL of the upstream side end face of the exhaust purification catalyst 13 is clogged due to buildup of particulates, if the exhaust gas which flows into the exhaust purification catalyst 13 is made to instantaneously change in air-fuel ratio, the output voltage VX of the air-fuel ratio sensor 23 will change by a slower speed delayed from the instantaneous change of the air-fuel ratio of the exhaust gas which flows into the exhaust purification catalyst 13. The reason why the speeds of change dV1 and dV2 of the output voltage VX of the air-fuel ratio sensor 23 become slower in this way when the particulate buildup region CL of the upstream side end face of the exhaust purification catalyst 13 is clogged due to buildup of particulates, is that the flow rate of the exhaust gas which flows out toward the air-fuel ratio sensor 23 from the exhaust purification catalyst 13 decreases as shown by GB in FIG. 25.

That is, if the particulate buildup region CL of the upstream side end face of the exhaust purification catalyst 13 starts to clog due to buildup of particulate and the flow rate of the exhaust gas which flows through the inside of the exhaust purification catalyst 13 downstream of the particulate buildup region CL of the upstream side end face of the exhaust purification catalyst 13 decreases, time will be required for the exhaust gas which was changed in air-fuel ratio to flow out from the downstream side end face of the exhaust purification catalyst 13. As a result, as shown in FIG. 27, the speeds of change dV1 and dV2 of the output voltage VX of the air-fuel ratio sensor 23 become slower. Further, if the particulate buildup region CL of the upstream side end face of the exhaust purification catalyst 13 is completely clogged due to buildup of particulates, the exhaust gas which changes in air-fuel ratio will circle around the air-fuel ratio sensor 23 for a while after flowing out from the downstream side end face of the exhaust purification catalyst 13. Therefore, in this case as well, time will be required for the exhaust gas which was changed in air-fuel ratio to reach the air-fuel ratio sensor 23 and, as a result, as shown in FIG. 27, the speeds of change dV1 and dV2 of the output voltage VX of the air-fuel ratio sensor 23 will become slower. Whatever the case, if the particulate buildup region CL of the upstream side end face of the exhaust purification catalyst 13 is clogged due to buildup of particulates, the speeds of change dV1 and dV2 of the output voltage VX of the air-fuel ratio sensor 23 will become slower.

Therefore, in still another embodiment of clogging judgment, when the speeds of change dV1 and dV2 of the output voltage VX of the air-fuel ratio sensor 23 fall, it is judged that the particulate buildup region CL of the upstream side end face of the exhaust purification catalyst 13 is clogged due to buildup of particulates. That is, in still another embodiment of clogging judgment, an exhaust purification catalyst 13 is arranged inside the engine exhaust passage and the hydrocarbon feed valve 15 is arranged upstream of the exhaust purification catalyst 13 inside the engine exhaust passage, the exhaust purification catalyst 13 is comprised of a straight flow type of catalyst which has a plurality of exhaust flow passages which extend in the longitudinal axial direction of the exhaust purification catalyst 13, a limited part of the region at the peripheral area of the upstream side end face of the exhaust purification catalyst 13 where there is a possibility of clogging occurring due to buildup of particulates in the exhaust gas is predicted in advance, an air-fuel ratio sensor 23 is arranged downstream of the peripheral area of the downstream side end face of the exhaust purification catalyst 13 inside of the exhaust gas flow region corresponding to the downstream side of the particulate buildup region CL when viewed along the longitudinal axis of the exhaust purification catalyst 13, when the exhaust gas which flows into the exhaust purification catalyst 13 is made to instantaneously change in air-fuel ratio, if the particulate buildup region CL at the peripheral area of the upstream side end face of the exhaust purification catalyst 13 clogs due to buildup of particulates in the exhaust gas, compared to the case where the catalyst is not clogged due to buildup of particulates, the speeds of change of the output value of the air-fuel ratio sensor 23 will fall, when it is judged if the particulate buildup region CL at the peripheral area of the upstream side end face of the exhaust purification catalyst 13 clogs due to buildup of particulates in the exhaust gas, the exhaust gas which flows into the exhaust purification catalyst 13 is made to instantaneously change in air-fuel ratio, and when the speed of change of the output value of the air-fuel ratio sensor 23 at this time falls, it is judged that the particulate buildup region CL at the peripheral area of the upstream side end face of the exhaust purification catalyst 13 clogs due to buildup of particulates in the exhaust gas.

In this case, the speed of change of the output voltage VX of the air-fuel ratio sensor 23 can be found by calculating the speed of change dV1 of the output voltage VX of the air-fuel ratio sensor 23 when the output voltage VX of the air-fuel ratio sensor 23 changes from VX1 to VX2 in FIG. 27, while the speed of change of the output voltage VX of the air-fuel ratio sensor 23 can be found by calculating the speed of change dV2 of the output voltage VX of the air-fuel ratio sensor 23 when the output voltage VX of the air-fuel ratio sensor 23 changes from VX2 to VX1 in FIG. 27. Further, the speed of change of the output voltage VX of the air-fuel ratio sensor 23 can be found by calculating the time t1 until the output voltage VX of the air-fuel ratio sensor 23 changes from VX1 to VX2 in FIG. 27, while the speed of change of the output voltage VX of the air-fuel ratio sensor 23 can be found by calculating the time t2 until the output voltage VX of the air-fuel ratio sensor 23 changes from VX2 to VX1 in FIG. 27.

That is, when the air-fuel ratio of the exhaust gas which flows into the exhaust purification catalyst 13 is made to instantaneously change, whether the speed of change of the output value of the air-fuel ratio sensor 23 falls can be judged based on any of the time t1 which is required for the fall in the output voltage of the air-fuel ratio sensor 23 at this time, the speed of fall dV1 of the output voltage of the air-fuel ratio sensor 23, the time t2 which is required for the rise in the output voltage of the air-fuel ratio sensor 23, and the speed of rise dV2 of the output voltage of the air-fuel ratio sensor 23. The speed of change of the output voltage VX of the air-fuel ratio sensor 23 can be found by various methods, but below, the case of calculating the time t1 for the output voltage VX of the air-fuel ratio sensor 23 to change from VX1 to VX2 in FIG. 27 and thereby find the speed of change of the output voltage VX of the air-fuel ratio sensor 23 will be used as an example to explain still another embodiment of clogging judgment.

Figure 28:
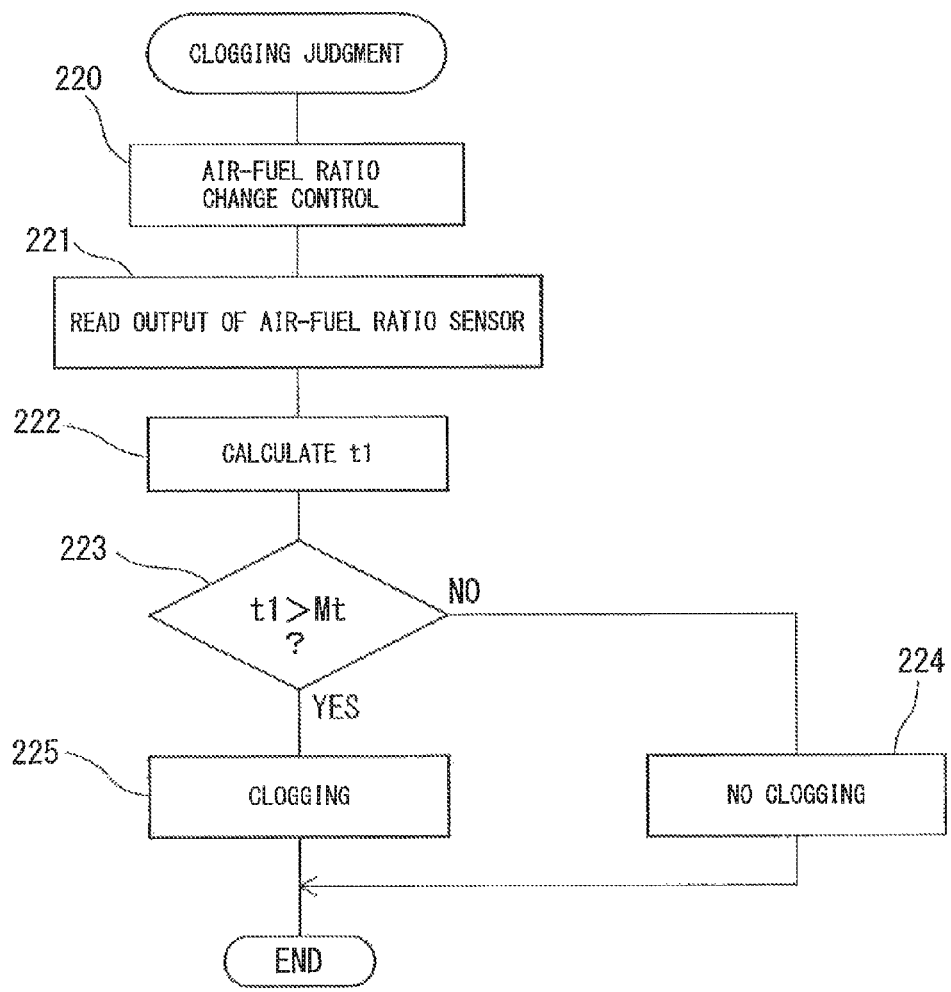
FIG. 28 is a flow chart for judging clogging.

FIG. 28 shows a routine for executing still another embodiment of clogging judgment. This routine is executed at step 102 of FIG. 19.

Referring to FIG. 28, first, to start, at step 220, air-fuel ratio change control is performed to make the exhaust gas which flows into the exhaust purification catalyst 13 instantaneously change in air-fuel ratio. At this time, in still another embodiment of the clogging judgment, as shown in FIG. 27, additional fuel is fed to the inside of the combustion chamber 2 or the hydrocarbon feed valve 15 injects hydrocarbons to thereby make the exhaust gas which flows into the exhaust purification catalyst 13 temporarily change in air-fuel ratio (A/F) to the rich side. Next, at step 221, the output voltage VX of the air-fuel ratio sensor 23 is read in. Next, at step 222, the time t1 which is required for the output voltage VX of the air-fuel ratio sensor 23 to change from VX1 to VX2 in FIG. 27 is calculated. Next, at step 223, it is judged if the time t1 has exceeded the predetermined reference time Mt.

When it is judged at step 223 that the time t1 has not exceeded the predetermined reference time Mt, the routine proceeds to step 224 where it is judged that the exhaust purification catalyst 13 is not clogged due to buildup of particulates in the exhaust gas. As opposed to this, when it is judged that the time t1 has exceeded the predetermined reference time Mt, the routine proceeds to step 225 where it is judged that the catalyst is clogged due to buildup of particulates.

Figure 29:
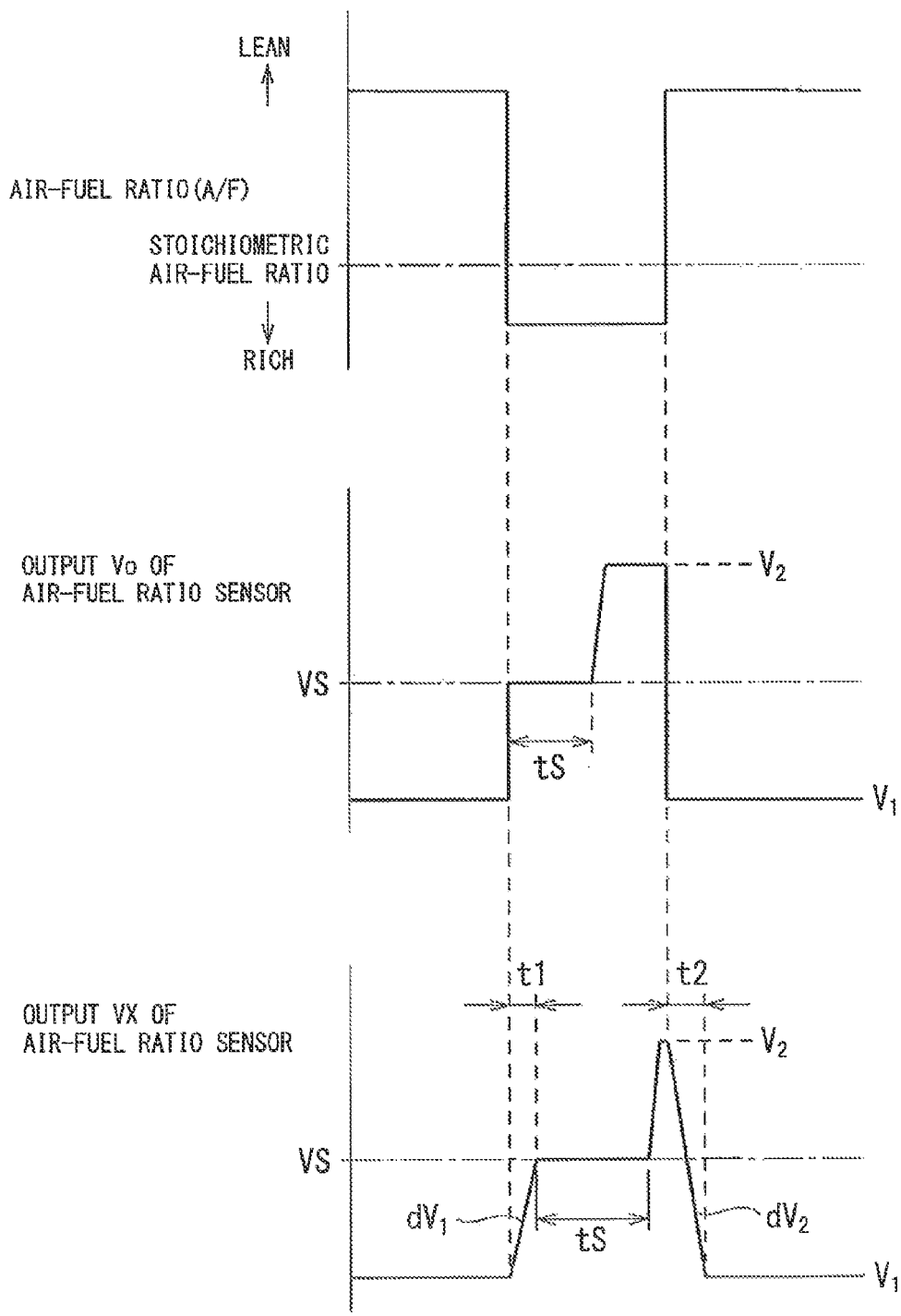
FIG. 29 is a view which shows changes in the output value of an air-fuel ratio sensor.
Figure 30:
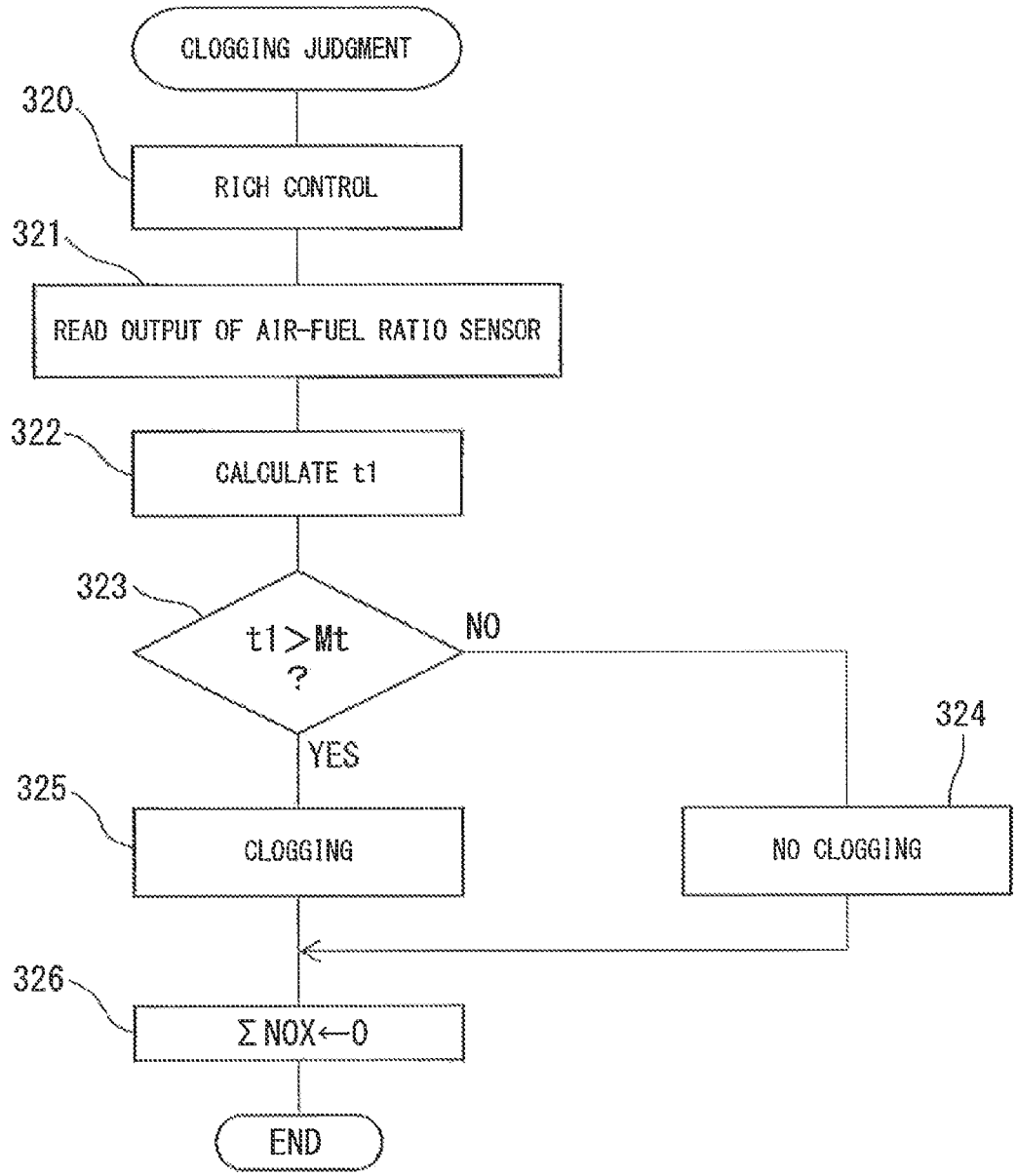
FIG. 30 is a flow chart for detecting clogging.

FIG. 29 and FIG. 30 show another embodiment in the case of using an air-fuel ratio sensor 23 constituted by an air-fuel ratio sensor which has the output characteristic which is shown in FIG. 26B. FIG. 29 shows the change in the output voltage of the air-fuel ratio sensor 23 when the air-fuel ratio (A/F) of the exhaust gas which flows into the exhaust purification catalyst 13 in this case is made to temporarily change from lean to rich. Note that, in FIG. 29, VO shows the change in the output voltage of the air-fuel ratio sensor 23 when the particulate buildup region CL of the upstream side end face of the exhaust purification catalyst 13 is not clogged due to buildup of the particulates, while VX shows the change in the output voltage of the air-fuel ratio sensor 23 when the particulate buildup region CL of the upstream side end face of the exhaust purification catalyst 13 is clogged due to buildup of particulates.

From FIG. 29, when the particulate buildup region CL of the upstream side end face of the exhaust purification catalyst 13 is not clogged due to buildup of particulates, if making the exhaust gas which flows into the exhaust purification catalyst 13 instantaneously change in air-fuel ratio from lean to rich, the output voltage Vo of the air-fuel ratio sensor 23 will instantaneously rise from V1 to VS, then the output voltage Vo of the air-fuel ratio sensor 23 will be maintained at VS. This VS, as shown in FIG. 26B, shows the output voltage V of the air-fuel ratio sensor 23 when the air-fuel ratio of the exhaust gas is the stoichiometric air-fuel ratio. That is, when the exhaust purification catalyst 13 has an oxygen storage ability, if the exhaust gas which flows into the exhaust purification catalyst 13 is made to change in air-fuel ratio from lean to rich, the air-fuel ratio of the exhaust gas which flows out from the exhaust purification catalyst 13 will be maintained at the stoichiometric air-fuel ratio until the oxygen which is stored in the exhaust purification catalyst 13 is consumed. Therefore, as shown in FIG. 29, if the exhaust gas which flows into the exhaust purification catalyst 13 is made to change in air-fuel ratio from lean to rich, the output voltage Vo of the air-fuel ratio sensor 23 will be maintained at VS until the oxygen which is stored in the exhaust purification catalyst 13 is consumed, that is, during the time tS. Next, the output voltage Vo of the air-fuel ratio sensor 23 rises to V2.

On the other hand, it is learned that when the particulate buildup region CL of the upstream side end face of the exhaust purification catalyst 13 clogs due to buildup of particulates, if the exhaust gas which flows into the exhaust purification catalyst 13 is made to change in air-fuel ratio from lean to rich, the output voltage VX of the air-fuel ratio sensor 23 will rise slowly by a speed dV1 delayed from the instantaneous change of the air-fuel ratio of the exhaust gas which flows into the exhaust purification catalyst 13. It is learned that if the exhaust gas which flows into the exhaust purification catalyst 13 is made to change in air-fuel ratio from rich to lean, the output voltage VX of the air-fuel ratio sensor 23 will fall by a slow speed dV2 delayed from the instantaneous change of the air-fuel ratio of the exhaust gas which flows into the exhaust purification catalyst 13.

Further, when the particulate buildup region CL of the upstream side end face of the exhaust purification catalyst 13 is clogged due to buildup of particulates, when the exhaust gas which flows into the exhaust purification catalyst 13 is temporarily switched in air-fuel ratio from lean to rich, the time t1 which is required for the output voltage VX of the air-fuel ratio sensor 23 to rise from V1 to VS and the time t2 which is required for the output voltage VX of the air-fuel ratio sensor 23 to fall from V2 to V1 increase. The fact that the speeds of change dV1 and dV2 of the output voltage VX of the air-fuel ratio sensor 23 become slow and the times t1 and t2 increase when the particulate buildup region CL of the upstream side end face of the exhaust purification catalyst 13 is clogged due to buildup of particulates as explained above, is caused by the flow rate of the exhaust gas which flows out toward the air-fuel ratio sensor 23 from the exhaust purification catalyst 13 decreases as shown by GB of FIG. 25.

Therefore, in a first example of the present invention, when the speeds of change dV1 and dV2 of the output voltage VX of the air-fuel ratio sensor 23 fall or the times t1 and t2 increase, it is judged that the particulate buildup region CL of the upstream side end face of the exhaust purification catalyst 13 is clogged due to buildup of particulates.

Further, when the particulate buildup region CL of the upstream side end face of the exhaust purification catalyst 13 is clogged due to buildup of particulates, as shown in FIG. 29, when the exhaust gas which flows into the exhaust purification catalyst 13 is made to change in air-fuel ratio from lean to rich, the time tS during which the output voltage VX of the air-fuel ratio sensor 23 is maintained at VS increases. That is, at this time, the exhaust gas which flows out toward the air-fuel ratio sensor 23 from the exhaust purification catalyst 13 is decreased in flow rate, so more time is required for consuming the stored oxygen. As a result, the time tS during which the output voltage VX of the air-fuel ratio sensor 23 is maintained at VS increases. Therefore, in this case, when the time tS during which the output voltage VX of the air-fuel ratio sensor 23 is maintained at VS increases, it can be judged that the particulate buildup region CL of the upstream side end face of the exhaust purification catalyst 13 is clogged due to buildup of particulates.

Note that, if the exhaust purification catalyst 13 deteriorates, the oxygen storage ability falls and, as a result, the time tS during which the output voltage VX of the air-fuel ratio sensor 23 is maintained at VS decreases. That is, when the exhaust purification catalyst 13 deteriorates, the time tS during which the output voltage VX of the air-fuel ratio sensor 23 is maintained at VS does not increase. The time tS during which the output voltage VX of the air-fuel ratio sensor 23 is maintained at VS increases when the particulate buildup region CL of the upstream side end face clogs due to buildup of particulates. Therefore, it becomes possible to use the change in the time tS during which the output voltage VX of the air-fuel ratio sensor 23 is maintained at VS to reliably detect the particulate buildup region CL of the upstream side end face of the exhaust purification catalyst 13 clogging due to buildup of particulates.

Therefore, in a second example according to the present invention, when the speeds of change dV1 and dV2 of the output voltage VX of the air-fuel ratio sensor 23 fall or the times t1 and t2 increase and the time tS during which the output voltage VX of the air-fuel ratio sensor 23 is maintained at VS increases, it is judged that the particulate buildup region CL of the upstream side end face of the exhaust purification catalyst 13 is clogged due to buildup of particulates.

Next, taking as an example the case of using an air-fuel ratio sensor 23 constituted by the air-fuel ratio sensor which has the output characteristic which is shown in FIG. 26B so as to calculate the time t1 until the output voltage VX of the air-fuel ratio sensor 23 changes from V1 to VS in FIG. 25 to thereby find the speed of change of the output voltage VX of the air-fuel ratio sensor 23, another embodiment of clogging judgment will be explained. Note that, in this clogging judgment, when the exhaust gas which flows into the exhaust purification catalyst 13 is made rich in air-fuel ratio so as to make the exhaust purification catalyst 13 release $NO_x$, it is judged if the particulate buildup region CL of the peripheral area of the upstream side end face of the exhaust purification catalyst 13 is clogged due to buildup of particulates in the exhaust gas.

FIG. 30 shows a first example of a routine which executes still another embodiment of clogging judgment. This routine is executed at step 102 of FIG. 19.

If referring to FIG. 30, first, to start, at step 320, rich control is performed for making the air-fuel ratio of the exhaust gas which flows into the exhaust purification catalyst 13 rich. That is, the additional fuel amount WR is calculated from the map which is shown in FIG. 15 and an additional fuel injection action is performed. At this time, the exhaust gas which is exhausted from the combustion chamber 2 is made rich in air-fuel ratio and the exhaust gas which flows into the exhaust purification catalyst 13 is made rich in air-fuel ratio (A/F) in. Next, at step 321, the output voltage V of the air-fuel ratio sensor 23 is read. Next, at step 322, the time t1 which is required for the output voltage VX of the air-fuel ratio sensor 23 to change from V1 to VS in FIG. 29 is calculated. Next, at step 323, it is judged if the time t1 has exceeded the predetermined reference time Mt.

When it is judged at step 323 that the time t1 has not exceeded the predetermined reference time Mt, the routine proceeds to step 324 where it is judged if the exhaust purification catalyst 13 has become clogged due to buildup of particulates. Next, the routine jumps to step 326. As opposed to this, when it was judged at step 323 that the time t1 has exceeded the predetermined reference time Mt, the routine proceeds to step 325 where it is judged if the catalyst is clogged due to buildup of particulates. Next, the routine proceeds to step 326. At step 326, ΣNOX is cleared.

Figure 31:
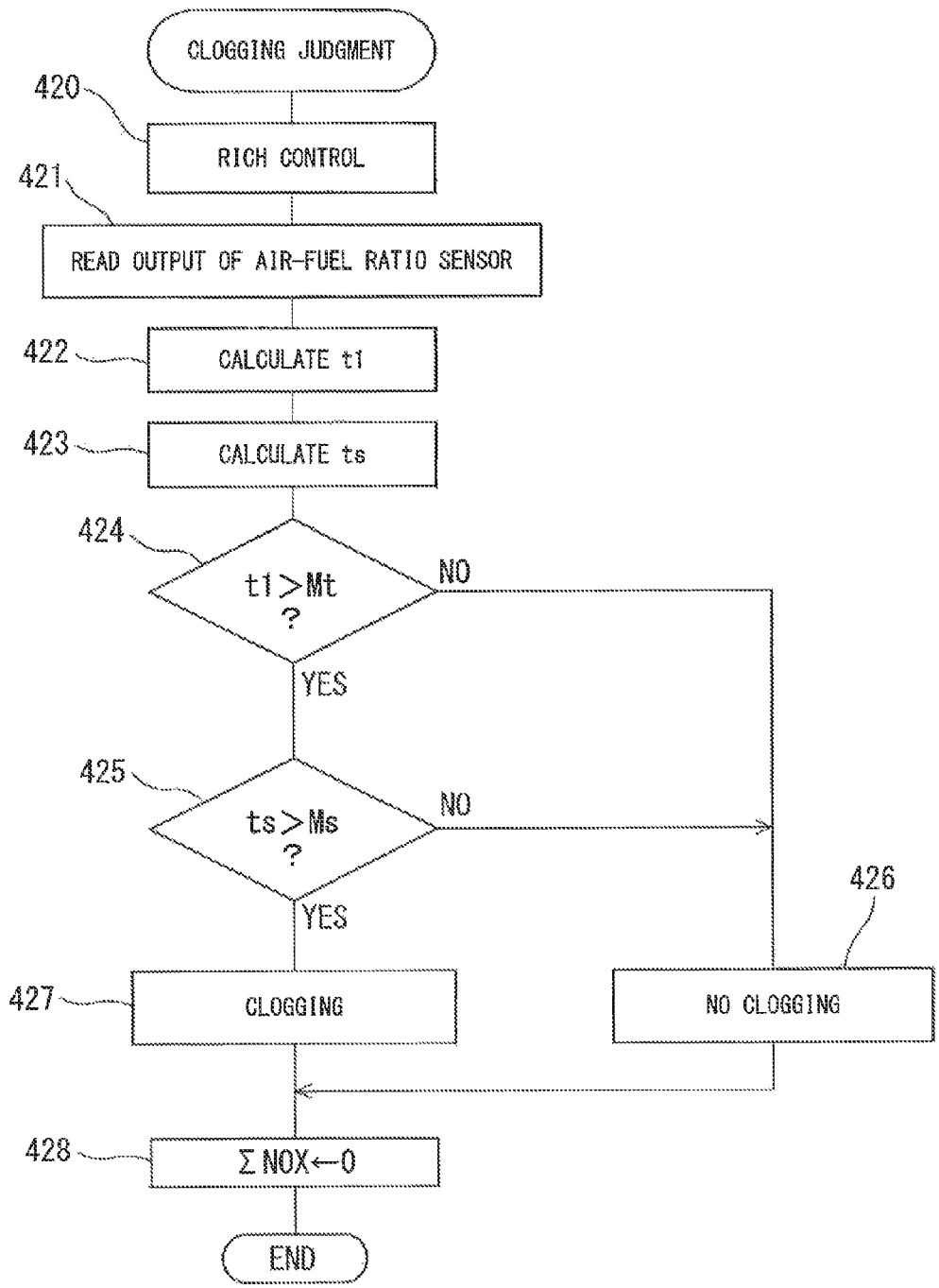
FIG. 31 is a flow chart for detecting clogging.

FIG. 31 shows a second example of a routine which executes still another embodiment of clogging judgment. This routine is executed at step 102 of FIG. 19.

Referring to FIG. 31, first, to start, at step 420, rich control is performed for making the air-fuel ratio of the exhaust gas which flows into the exhaust purification catalyst 13 rich. That is, the additional fuel amount WR is calculated from the map which is shown in FIG. 15 and an additional fuel injection action is performed. At this time, the exhaust gas which flows into the exhaust purification catalyst 13 is made rich in air-fuel ratio (A/F) in. Next, at step 421, the output voltage V of the air-fuel ratio sensor 23 is read. Next at step 422, the time t1 which is required for the output voltage VX of the air-fuel ratio sensor 23 to change from V1 to VS in FIG. 29 is calculated. Next, at step 423, the time tS during which the output voltage VX of the air-fuel ratio sensor 23 is maintained at VS is calculated.

Next, at step 424, it is judged if the time t1 has exceeded the predetermined reference time Mt. When it is judged at step 424 that the time t1 has not exceeded the predetermined reference time Mt, the routine proceeds to step 426 where it is judged that the catalyst is not clogged due to buildup of particulates. Next, the routine jumps to step 428. As opposed to this, when, at step 424, it is judged that the time t1 has exceeded the predetermined reference time Mt, the routine proceeds to step 425 where it is judged if the time tS has exceeded the predetermined reference time MS. When it is judged at step 425 that the time tS has not exceeded the predetermined reference time MS, the routine proceeds to step 426 where it is judged that the catalyst is not clogged due to buildup of particulates. Next, the routine jumps to step 428.

As opposed to this, when it is judged at step 425 that the time tS has exceeded a predetermined reference time MS, the routine proceeds to step 427 where it is judged if the catalyst is clogged due to buildup of particulates. Next, the routine proceeds to step 428. At step 428, ΣNOX is cleared.

Next, referring to FIG. 32, another embodiment of $NO_x$ removal control will be explained.

In the embodiment which is shown in FIG. 19, first, it is judged whether to perform the first $NO_x$ removal method. When the $NO_x$ removal action by the first $NO_x$ removal method should be performed, it is judged if the exhaust purification catalyst 13 is clogged due to buildup of particulates in the exhaust gas.

Figure 32:
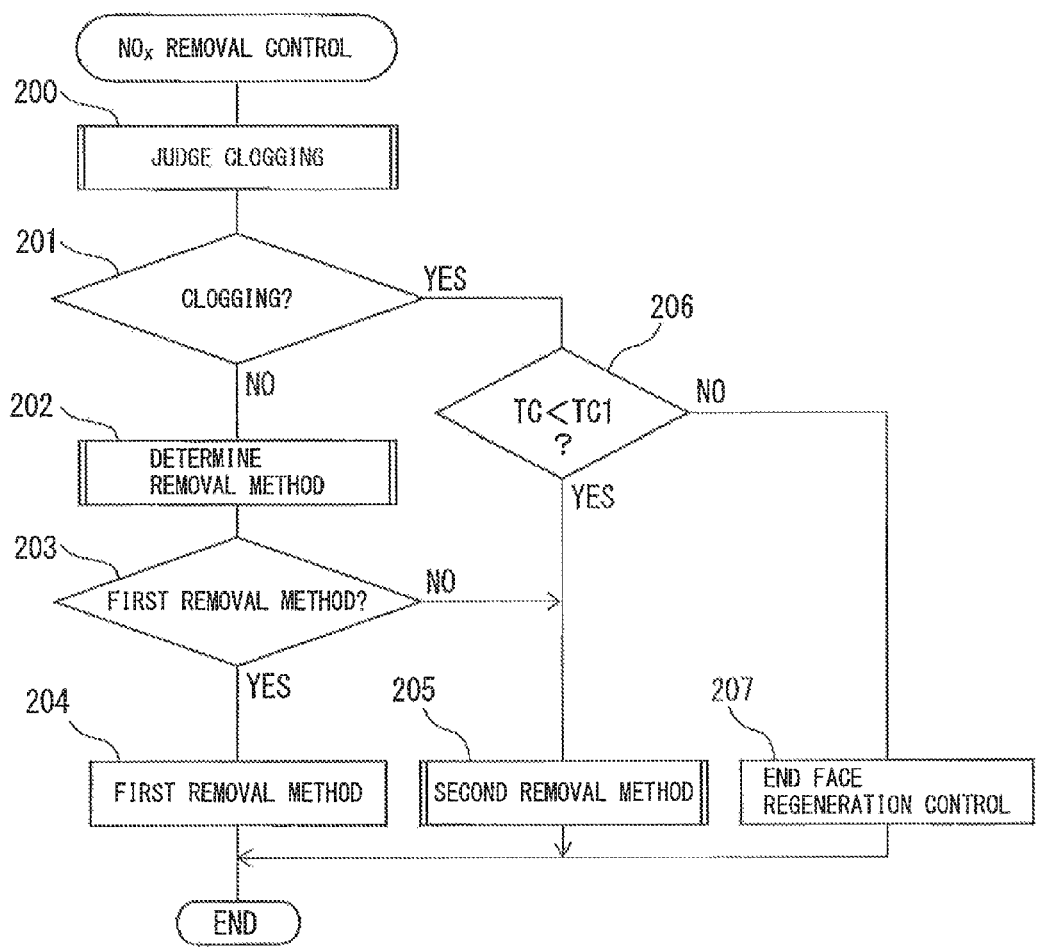
FIG. 32 is a flow chart for $NO_x$ removal control.

As opposed to this, in the embodiment which is shown in FIG. 32, first, it is judged the exhaust purification catalyst 13 is clogged due to buildup of particulates in the exhaust gas. When it is judged that it is not clogged, it is judged whether to perform the first $NO_x$ removal method.

FIG. 32 shows an $NO_x$ removal control routine for performing an $NO_x$ removal control method of another embodiment according to the present invention. This routine is performed by interruption every certain time period.

Referring to FIG. 32, first, to start, at step 200, a routine is performed to judge whether the exhaust purification catalyst 13 is clogged due to buildup of particulates in the exhaust gas. This routine is for example shown in FIG. 20. Next, at step 201, it is judged if the exhaust purification catalyst 13 is clogged due to buildup of particulates in the exhaust gas. When it is judged that the exhaust purification catalyst 13 is not clogged due to buildup of particulates in the exhaust gas, the routine proceeds to step 202 where it is decided which of the $NO_x$ removal action by the first $NO_x$ removal method and the $NO_x$ removal action by the second $NO_x$ removal method to perform. Next, at step 203, it is judged whether the $NO_x$ removal action by the first $NO_x$ removal method should be performed. When the $NO_x$ removal action by the first $NO_x$ removal method should be performed, the routine proceeds to step 204 where the $NO_x$ removal action by the first $NO_x$ removal method is performed. That is, the hydrocarbon feed valve 15 injects the injection amount W of hydrocarbons which is shown in FIG. 11 in accordance with the operating state of: the engine by a predetermined injection period ΔT. When at step 203 the $NO_x$ removal action by the second $NO_x$ removal method should be performed, the routine proceeds to step 205 where a routine is performed to perform the $NO_x$ removal action by the second $NO_x$ removal method. This routine is shown in FIG. 21.

When it is judged at step 201 that the exhaust purification catalyst 13 is clogged due to buildup of particulates in the exhaust gas, the routine proceeds to step 206 where it is judged if the catalyst temperature TC is lower than the set temperature TC1. When TC<TC1, the routine proceeds to step 205 where a routine for execution of the $NO_x$ removal action by the second $NO_x$ removal method is performed. As opposed to this, when TC>TC1, the routine proceeds to step 207 where end face regeneration control is performed.

Note that, as another embodiment, an oxidation catalyst for reforming the hydrocarbons may also be arranged upstream of the exhaust purification catalyst 13 inside the engine exhaust passage.

REFERENCE SIGNS LIST 4 intake manifold
5 exhaust manifold
12a, 12b exhaust pipe
13 exhaust purification catalyst
14 particulate filter
15 hydrocarbon feed valve
25 pressure sensor
26 differential pressure sensor

The invention claimed is:

1. An exhaust purification device for an internal combustion engine, comprising:
an engine exhaust passage;
an exhaust purification catalyst arranged inside the engine exhaust passage and having an exhaust gas flow surface, a precious metal catalyst being carried on the exhaust gas flow surface, a basic exhaust gas flow surface part being formed around the precious metal catalyst, the exhaust purification catalyst having a property of reducing NO $_x$ which is contained in the exhaust gas when making a concentration of hydrocarbons which flow into the exhaust purification catalyst vibrate with a vibration amplitude within a predetermined range of amplitude and with a vibration period within a predetermined range of period and having a property of being increased in amount of storage of $NO_x$ which is contained in the exhaust gas when making the vibration period of the hydrocarbon concentration longer than the predetermined range of period;
a hydrocarbon feed valve arranged upstream of the exhaust purification catalyst in the engine exhaust passage; and
an electronic control unit,
wherein the electronic control unit is configured to selectively perform one of a first $NO_x$ removal method, and
a second $NO_x$ removal method,
wherein the electronic control unit is configured to control the hydrocarbon feed valve to inject hydrocarbon with a period within the predetermined range of period to thereby reduce $NO_x$ contained in the exhaust gas when the first $NO_x$ removal method is to be performed,
wherein the electronic control unit is configured to control an air-fuel ratio of the exhaust gas which flows into the exhaust purification catalyst rich with a period longer than the predetermined range of period to thereby release stored $NO_x$ from the exhaust purification catalyst and reduce the $NO_x$ when the second $NO_x$ removal method is to be performed,
wherein the electronic control unit is configured to judge whether the exhaust purification catalyst is clogged due to buildup of particulates in the exhaust gas, and
wherein the electronic control unit is configured to perform the second $NO_x$ removal method when it is judged that the exhaust purification catalyst is clogged due to buildup of particulates in the exhaust gas.

2. The exhaust purification device for an internal combustion engine according to claim 1, wherein the exhaust purification device further comprises a temperature sensor which detects temperature of the exhaust purification catalyst, wherein the electronic control unit is configured to judge if the temperature of the exhaust purification catalyst is lower than a predetermined set temperature when it is judged that the exhaust purification catalyst is clogged due to buildup of particulates, and is configured to perform the second $NO_x$ removal method when it is judged that the temperature of the exhaust purification catalyst is lower than the predetermined set temperature.

3. The exhaust purification device for an internal combustion engine according to claim 2, wherein the electronic control unit is configured to increase the temperature of the exhaust purification catalyst to remove the particulate which deposited on the exhaust purification catalyst when it is judged that the temperature of the exhaust purification catalyst is higher than the predetermined set temperature.

4. The exhaust purification device for an internal combustion engine according to claim 1, wherein the exhaust purification device further comprises a pressure sensor which detects a pressure upstream of the exhaust purification catalyst in the exhaust passage and a differential pressure sensor which detects a pressure difference across a particulate filter which is arranged downstream of the exhaust purification catalyst in the exhaust passage, and wherein the electronic control unit is configured to judge if the exhaust purification catalyst is clogged due to buildup of particulates in the exhaust gas based on the pressure upstream of the exhaust purification catalyst in the exhaust passage and the differential pressure across the particulate filter.

5. The exhaust purification device for an internal combustion engine according to claim 1, wherein the exhaust purification device further comprises an air-fuel ratio sensor arranged downstream of the exhaust purification catalyst in the exhaust passage, wherein the electronic control unit is configured to change air-fuel ratio of the exhaust gas which flows into the exhaust purification catalyst instantaneously, and judge if the exhaust purification catalyst is clogged due to buildup of particulates based on an output of the air-fuel ratio at that time.

* * * * *